United States Patent [19]
Juang et al.

[11] Patent Number: 5,675,704
[45] Date of Patent: Oct. 7, 1997

[54] SPEAKER VERIFICATION WITH COHORT NORMALIZED SCORING

[75] Inventors: Biing-Hwang Juang, Lincroft; Chin-Hui Lee, New Providence; Aaron Edward Rosenberg, Berkeley Heights; Frank Kao-Ping Soong, Warren, all of N.J.

[73] Assignee: Lucent Technologies Inc., Murray Hill, N.J.

[21] Appl. No.: 638,401

[22] Filed: Apr. 26, 1996

Related U.S. Application Data

[63] Continuation of Ser. No. 209,695, Mar. 9, 1994, abandoned, which is a continuation of Ser. No. 959,302, Oct. 9, 1992, abandoned.

[51] Int. Cl.$^6$ .................................................. G10L 5/06
[52] U.S. Cl. ............................... 395/2.55; 395/2.59
[58] Field of Search ............................... 395/2.55–2.59

[56] References Cited

U.S. PATENT DOCUMENTS

| | | | |
|---|---|---|---|
| 4,094,493 | 6/1978 | Sakoe | 381/42 |
| 4,581,755 | 4/1986 | Sakoe | 381/42 |
| 4,694,493 | 9/1987 | Sakoe | 381/42 |
| 4,720,863 | 1/1988 | Li et al. | 381/42 |
| 4,837,830 | 6/1989 | Wrench et al. | 395/2 |
| 4,910,782 | 3/1990 | Watari | 381/42 |
| 4,959,855 | 9/1990 | Daudelin | 379/213 |
| 4,979,206 | 12/1990 | Padden et al. | 379/67 |
| 5,091,947 | 2/1992 | Ariyoshi et al. | 381/42 |
| 5,127,043 | 6/1992 | Hunt et al. | 379/88 |

OTHER PUBLICATIONS

L. R. Rabiner et al., "A Model–Based Connected–Digit Recognition System Using Either Hidden Markov Models or Templates," vol. 1 Computer Speech and Language, 167–97 (1986).

A. Higgins et al., "Speaker Verification Using Randomized Phrase Prompting," Digital Signal Processing, vol. 1, 89–106 (1991).

C–H. Lee et al., "A Frame–Synchronous Network Search Algorithm for Connected Word Recognition," IEEE Trans. on ASSP, vol. 37, 1649–1658, Nov. 1989.

A. E. Rosenberg, "Evaluation of an Automatic Speaker–Verification System Over Telephone Lines," vol. 55 Bell System Tech. Journal, 723–44, (Jul.–Aug. '76).

L. R. Rabiner et al., "A Segmental K–Means Training Procedure for Connected Word Recognition," AT&T Tech. J., vol. 65, No. 3, 21–31 (May–Jun. 1986).

C–H. Lee et al., "Acoustic modeling for large vocabulary speech recognition," Computer Speech and Language, vol. 4, 127–165 (1990).

M. J. Carey et al., "A Speaker Verification System Using Alpha–Nets," ICASSP'91 Toronto, 397–400 (1991).

J. M. Naik, "Speaker Verification: A Tutorial," IEEE Communications Magazine, 42–48 (Jan. 1990).

Brochure relating to the Sprint VOICECARD service, pp. 1–5, 1990.

*Primary Examiner*—Allen R. MacDonald
*Assistant Examiner*—Michael N. Opsasnick
*Attorney, Agent, or Firm*—Thomas A. Restaino; Kenneth M. Brown

[57] ABSTRACT

A facility is provided for allowing a caller to place a telephone call by merely uttering a label identifying a desired called destination and to charge the telephone call to a particular billing account by merely uttering a label identifying that account. Alternatively, the caller may place the call by dialing or uttering the telephone number of the called destination or by entering a speed dial code associated with that telephone number. The facility includes a speaker verification system which employs cohort normalized scoring. Cohort normalized scoring provides a dynamic threshold for the verification process making the process more robust to variation in training and verification utterances. Such variation may be caused by, e.g., changes in communication channel characteristics or speaker loudness level.

17 Claims, 15 Drawing Sheets

SPEAKER VERIFICATION WITH COHORT NORMALIZED SCORING

This application is a continuation of application Ser. No. 08/209,695, filed on Mar. 9, 1994 now abandoned which is a continuation of Ser. No. 07/959,302 filed on Oct. 9, 1992, now abandoned.

FIELD OF THE INVENTION

The invention relates generally to speech processing, and more specifically to the field of speaker verification.

BACKGROUND OF THE INVENTION

Telephone credit or calling cards, although convenient, are susceptible to being compromised by potential unauthorized users. Indeed, fraudulent use of such cards has become a serious problem. To combat such fraudulent use, a telecommunications system may employ an automatic speaker verification system. A speaker verification system recognizes an individual by verifying a claim of identity provided by the individual through an analysis of spoken utterances. In the context of a telecommunications system, speaker verification may be employed to verify the identity of a caller who is charging a call to a credit or calling card. Generally, a speaker verification system operates by comparing extracted features of an utterance received from an individual who claims a certain identity to one or more prototypes of speech based on (or "trained" by) utterances provided by the identified person.

A problem frequently encountered in speaker verification in the telecommunication context is that a person who has trained a verification system does not always "sound the same" when undertaking a verification trial. Changes in a person's "sound" over time may be caused by, e.g., changes in the characteristics of the telecommunications channel carrying the person's voice signals. These changes may be caused by no more than the use of different telephones for the training process and the verification trial. Naturally, such changes degrade verification system performance. Because of sensitivity to changing channel characteristics, or even a speaker's loudness level, verification system performance may degrade to unacceptable levels.

SUMMARY OF THE INVENTION

Automatic speech processing can be used to provide a subscriber of a telecommunications system with a number of enhanced functionalities, including a speaker verification functionality. An embodiment of the present invention provides a telecommunications system platform for, inter alia, the verification of a subscriber's identity based on analysis of subscriber speech utterances. The platform allows a caller to claim a subscriber's identity via, e.g., an associated telephone station keypad. The platform then verifies the identity of the caller to be that of the identified subscriber.

The illustrative platform accomplishes speaker verification with the use of cohort normalized scoring employing hidden Markov models. A cohort is a set of subscribers whose hidden Markov models are, e.g., similar to the hidden Markov models of the subscriber whose identity is claimed. In accordance with the invention, an utterance supplied by a caller purported to be spoken by a claimed subscriber is scored against hidden Markov models trained by that subscriber and models trained by each member of the cohort. A statistic of the cohort scores is formed. The speaker's score is normalized by the formation of a ratio of the score for the purported speaker and the statistic of the cohort scores (or by the formation of a difference of their logarithms). This normalization provides a dynamic threshold which makes verification scoring more robust to variation in training and verification utterances caused by, e.g., changes in communication channel characteristics or speaker loudness level.

DETAILED DESCRIPTION

Figure 1:
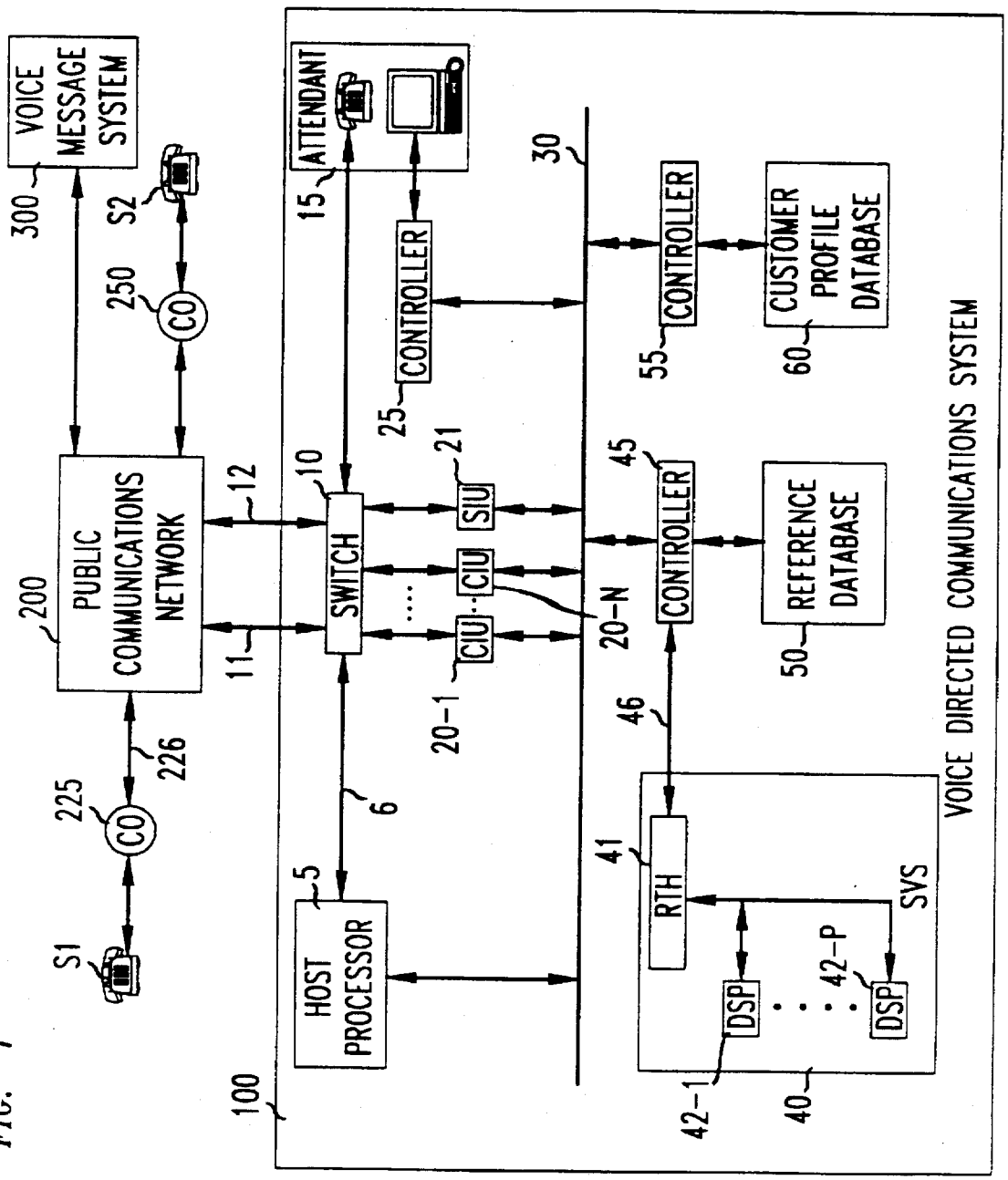
FIG. 1 is a block diagram of a communications system in which the principles of the invention may be practiced.

Voice Directed Communications System (VDCS) 100 shown in FIG. 1 includes a number of functionalities which operate in concert with one another to, inter alia, recognize a caller from the caller's speech signals received via communications path 11 or 12. Such recognition is based on comparing features of received speech signals with a model for such signals that was originally constructed at the time the caller subscribed to the functionalities (or services) of VDCS 100.

In particular, a telephone user, e.g., the user associated with station S1, may subscribe to the services offered by VDCS 100 by dialing a predetermined subscription telephone number, e.g., 1-800-826-5555. When the user dials the last digit forming that number, then Central Office, CO, 225 associates the dialed number with public communications network 200 and extends the call thereto via path 226. In doing so, CO 225 sends the dialed (called) telephone number as well as the calling telephone number to network 200. Network 200, which may be, for example, the AT&T public switched network, extends the call connection, in a conventional manner, to a network 200 destination switch (not shown) that connects to VDCS 100. The network 200 destination switch, in turn, extends the call via a selected one of trunks 11 and 12 connecting to switch 10 of VDCS 100. The destination switch then supplies the calling and called telephone numbers to switch 10 via the selected trunk.

Switch 10, in response to the incoming call, sends a message containing, inter alia, the calling and called telephone numbers and identity of the selected trunk to host processor 5 via bus 6. In an illustrative embodiment of the invention, host processor 5 and switch 10 may be, for example, the StarServer FT processor available from AT&T and the model SDS 1000 switch available from Summa Four, respectively.

Host processor 5, responsive to the switch 10 message containing the associated subscription telephone number, directs switch 10 via bus 6 to establish a connection between the incoming call connection and one of a plurality of attendant (operator) positions 15, one of which is shown in the FIG. At that point, the attendant 15 may communicate with the station S1 caller to acquire information from the caller relating to the billing and processing of calls that the caller or "new subscriber" will subsequently place via system 100. Such information may include, for example, the caller's name, address, billing account, etc. As a result of such communication, the caller is assigned an account code comprising a predetermined number of digits, some of which, e.g., the first seven digits, may be selected by the caller. The remaining digits of the account code are selected by system 100 and are used as so-called "check" digits.

Figure 2:
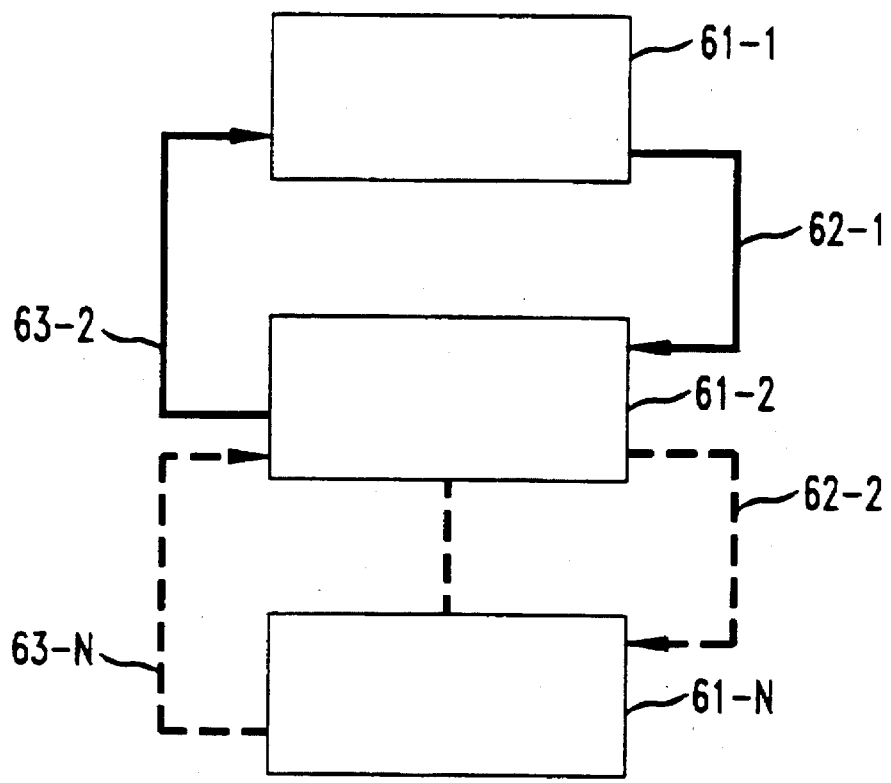
FIG. 2 is an illustrative example of linking particular subscriber records to one another.
Figure 14:
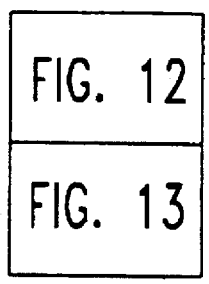
FIG. 14 shows the manner in which FIGS. 12 and 13 should be arranged with respect to one another.

The new subscriber's account code may be a code that has already been assigned to another subscriber. If that is case, then host 5 causes that fact to be displayed on terminal 15. That is, terminal 15 displays on its display the service profile, or record, associated with a particular one of the other subscribers that will be sharing the same account code with the new subscriber. At that point, the attendant may change the latter service record so that it (a) indicates that the associated account code is being shared with the new subscriber, (b) points to the new subscriber's service record and (c) contains the new subscriber's identity. The new subscriber's record is similarly arranged so that it points to the latter service record. An illustrative example of such linking is shown FIG. 2.

Briefly, a chain of service records are linked to one another by storing in each such record the address of the next record in the chain and the address of the previous record in the chain. Each of the records 61-2 through 61-N thus contains the address, e.g., pointer 62-2, of the next record in the chain and, except for head record 61-1, the address, e.g., pointer 63-2, of the previous record in the chain. The way in which system 100 identifies a caller that is sharing an account code with one or more other subscribers is discussed below.

As a further result of such communication, the new subscriber may define a number of voice-identified calling labels and associate the labels with respective telephone numbers. For example, the subscriber may associate the label (a) "call home" with the subscriber's home telephone number, (b) "call office" with the subscriber's work or office telephone number, (c) "call Dad" with the subscriber's father's telephone number, etc. Thereafter, and as will be explained below, when the subscriber places a call to system 100 for the purpose of placing a call to a particular location, e.g., "home", then all that the subscriber needs to do in response to a particular system 100 request is to say "call home". System 100, in response thereto, associates the spoken identifier "call home" with the subscriber's home telephone number and then places an outgoing telephone call thereto via switch 10 and network 200. System 100 then causes switch 10 to interconnect the outgoing call with the subscriber's incoming call.

The new subscriber may also associate particular telephone numbers with respective billing accounts. For example, the new subscriber may specify that all telephone calls that the new subscriber places to his/her office via system 100 are to be billed to a particular billing account, for example, a credit card account. As another example, the subscriber may specify that all telephone calls that the new subscriber places to a business associate via system 100 are to be billed to another account, e.g., a business telephone number. The new subscriber may also specify a default billing account for all other calls that the subscriber places via system 100, in which the default billing account may be the new subscriber's system 100 service number or home telephone number.

The new subscriber may also specify voice-identified billing labels which may or may not be tied to a particular telephone number(s), but which the subscriber may use to override default or predefined billing. Specifically, such a billing label may be, for example, the name of a credit card service, such as VISA; a calling card service, such as AT&T; or a particular telephone number. For example, assume that the subscriber has tied billing of office calls to an AT&T calling card number and has specified VISA as a billing label. Thereafter, the subscriber may place a telephone call to his/her office and, if desired, override the predefined AT&T calling card billing for the call by saying "bill VISA" following the entering of the subscriber's office telephone number. More particularly, if the subscriber has specified a calling label for the office telephone number, then the subscriber may initiate a call to his office telephone by saying "call office". The subscriber then pauses for a predetermined duration, e.g., at least one second, to disassociate the calling label from the billing label. At the end of one second, the subscriber may then say "bill VISA" to override the predefined billing for the office call.

System 100, in response thereto, (a) translates the identifier "call office" into the subscriber's office telephone number, (b) places an outbound call to that number via switch 10 and network 200, and (c) connects the subscriber's call to the outbound call. Similarly, as a result of the pause, system 100 associates the identifier "bill VISA" with a billing function and overrides the predefined, or default billing priorly specified for the call. Accordingly, system 100 bills the call to the subscriber's VISA account.

The aforementioned pause may be eliminated in all but a few cases by employing speaker independent "word spotting" for the words "call", (or "dial") and "bill", (or "charge"). Accordingly, when system 100 spots the spoken word "call" ("dial") it classifies that word and the following speech signals as a calling label. If system 100 then spots the spoken word "bill" ("charge") it classifies that word and the following speech signals as an overriding billing label, as will be discussed below.

The new subscriber may associate a particular speed dialing code with a telephone number. Illustratively, a speed dialing code is terminated by a predetermined suffix, e.g., the pound sign (#). For example, the new subscriber may specify 1# and 2# as the speed dialing codes for respective telephone numbers, e.g., 1-800-555-1212 and 1-908-555-1212, respectively.

When the attendant has collected and entered the new subscriber's subscription information, including the aforementioned labels (if any) in terminal 15, (FIG. 1) the attendant then supplies the entered information to controller 25 for delivery to controller 55 via Local Area Network (LAN) 30. In the illustrative embodiment of the invention, LAN 30 may be, for example, the well-known Ethernet network.

Controller 25, more particularly, forms the subscription information into a message addressed to controller 55 and transmits the message over LAN 30. Controller 55, in turn, removes the message from LAN 30 and forms the contents thereof into a subscription profile (or record) associated with the new subscriber and stores the profile in customer profile database 60 in the manner discussed below. (If the new subscriber's account code is a shared code, then controller 55 effectively "links" the new subscriber's profile record to the profile record associated with the subscriber that is sharing the account code with the new subscriber.)

At this point in the subscription process, the new subscriber's account code, various labels, associated telephone numbers, speed dial codes, etc., are stored in database 60 as ASCII text.

As a last step in the subscription process, the attendant instructs the new subscriber how to register particular speech utterances characterizing the new subscriber's account code, as well as the aforementioned labels, so that the registration may be used thereafter to verify the new subscriber's identity and verbal requests. To that end, the attendant sends to host 5, via terminal 15 and LAN 30, a request to invoke a voice registration session, in which the request contains the subscriber's account code and labels. Host 5, in response thereto, causes switch 10 to bridge Subscription Identification Unit (SIU) 21 onto the switch 10 connection between the subscriber's incoming call connection and attendant terminal 15 to perform a registration process for the new subscriber. In addition, host 5 supplies via LAN 30 the new subscriber's account code and labels to SIU 21.

SIU 21, in particular, includes, inter alia, a number of digital signal processors, such as the AT&T DSP 32, which operate to perform a number of different voice processing functions including, inter alia, automatic speech recognition, and text-to-speech processing for generating voice prompts and verbal facsimiles of the new subscriber's labels. The automatic speech recognition function, more particularly, performs connected digit recognition and an analysis of the subscriber's utterances providing feature vectors of autocorrelation coefficients using techniques that are well-known in the speech recognition art.

Figure 3:
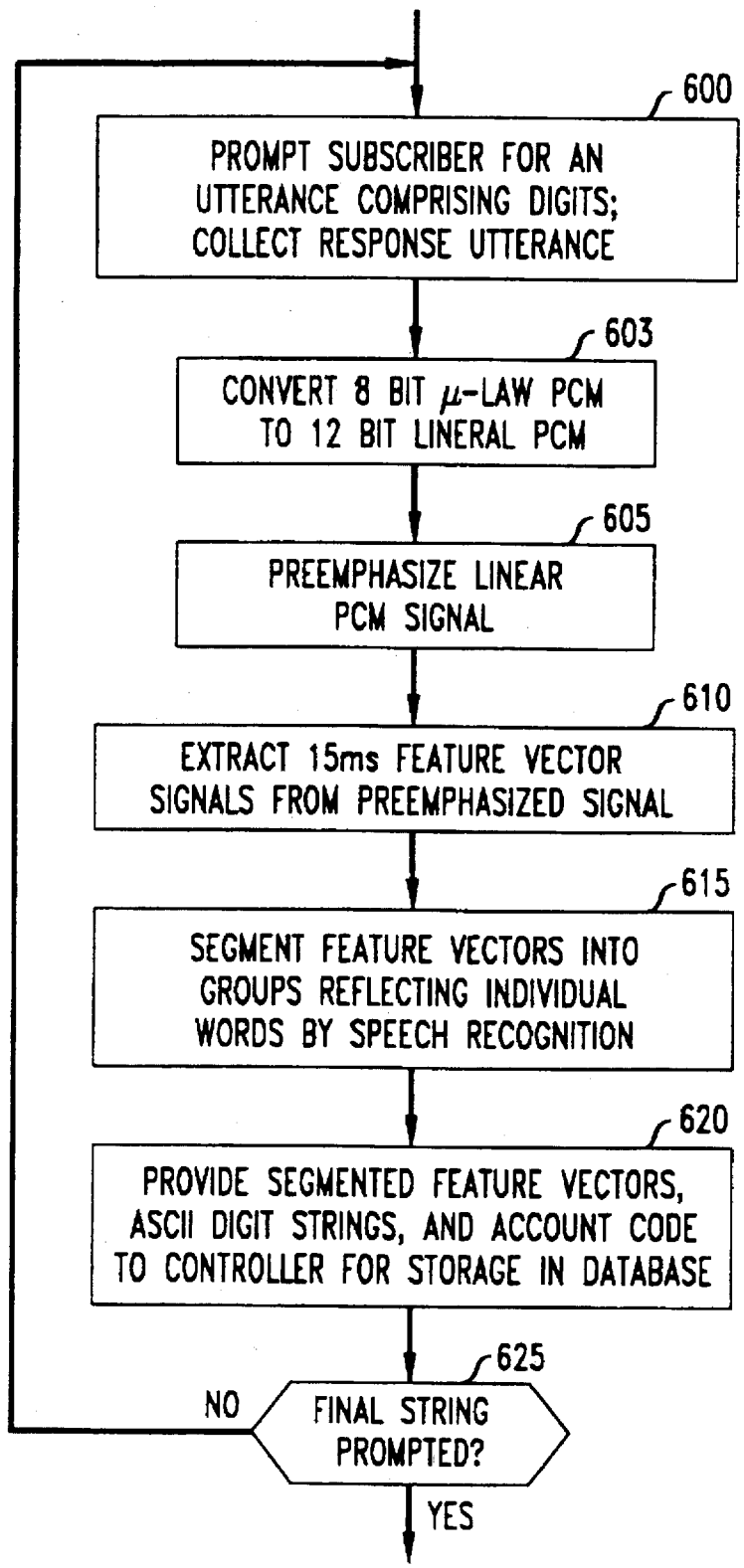
FIG. 3 is a flow chart of the operation of a subscription identification unit and a caller identification unit as it concerns the analysis of utterances for purposes of speaker verification.

Regarding the analysis of utterances by a new subscriber, SIU 21 operates according to the flow diagram presented in FIG. 3. As shown at step 600 of FIG. 3, SIU 21 prompts the new subscriber to say one of a predetermined number of different strings of digits (e.g., eleven strings announced one string at a time) which comprises a predetermined number of digits, e.g., five digits. For example, SIU 21 prompts the new subscriber to say the digit string of 0,1,0,1,2. When the new subscriber responds by saying the completed string, SIU 21 collects the new subscriber's utterances for further processing.

As shown at step 603 of FIG. 3, SIU 21 performs a format conversion of the new subscriber's string utterance from 8-bit μ-law pulse-code modulated (PCM) digital samples (the digital format of a subscriber's utterance as provided from the public communications network 200) to a signal of 16-bit linear PCM digital samples. SIU 21 then preemphasizes the digital signal, as shown at step 605, by implementing a first-order difference filter well known in the art.

Feature vectors characterizing time-slices of the preemphasized signal are then formed by SIU 21, as shown at step 610. The time-slices are provided by a 45 millisecond (ms) Hamming window which is shifted every 15 ms (thus, a given 45 ms time-slice overlaps adjacent time-slices by 30 ms). Each time-slice is the basis of a vector of 10th order autocorrelation coefficients representing the time slice. This vector is referred to as a feature vector. The feature analysis performed by SIU 21 is well-known in the art and is described in further detail by C.-H. Lee, et al., *Acoustic Modeling for Large Vocabulary Speech Recognition*, 4 Computer Speech and Language 127–65 (1990), which is hereby incorporated by reference as if set forth fully herein.

SIU 21 then segments the feature vectors into sets of vectors representing the respective digits of the utterance as shown at step 615. Segmentation of the subscriber's utterances into digits is performed using speaker-independent recognition of digit and non-speech signals well-known in the art.

SIU 21 passes the resulting segmented autocorrelation coefficient feature vectors, the ASCII representation of the corresponding digit string, and the subscriber's account code to controller 45 for further signal processing as will be explained below (see step 620). As shown at step 625, the above process is repeated for each of the balance of the string utterances prompted at step 600.

In addition to providing a basis to accomplish speaker verification, the registration procedure also involves an analysis of utterances to provide a basis for the recognition of subscriber labels. For example, assume that the new subscriber specified (a) "call home" and "call office" as calling labels and (b) "bill Visa" as an overriding billing label. SIU 21 registers the new subscriber's voice representation of those labels by passing the ASCII equivalent (text version) of the first calling label ("home") through a text-to-speech processor and transmitting the result to the subscriber along with a request to verbally repeat the label. Responsive to the subscriber's utterance of that label, SIU 21 segments the subscriber's speech signals into a series of subword unit phoneroes characterizing the internal label and associates each such subword unit phoneme with a particular index value, thereby forming a series of indicas, or numbers. Thus, a particular utterance of a label is modeled as a series of indices and stored in memory. Thereafter, the particular utterance may be interpreted by generating such a series of subword indices for the utterance, and comparing the generated series with each priorly stored series of indices characterizing respective labels. The stored series that compares with the generated series will then point to the telephone number, or billing account, identified by the utterance. SIU 21 then passes the resulting ASCII indices, the corresponding ASCII representation of the voice label and subscriber's account code to controller 45 via LAN 30. SIU 21 then repeats the foregoing process for each of the subscriber's other labels.

At this point, SIU 21 has essentially completed its part in the registration process. However, before returning control of the subscriber's telephone call to attendant 15, SIU 21 waits for a confirmation message from controller 45 indicating that voice verification models and feature vectors of the subscriber's speech utterances have been stored in database 50.

Controller 45, more particularly, upon receipt of the ASCII representation of the last string of digits and resulting feature vectors of autocorrelation coefficients, passes those feature vectors and their respective digit strings to SVS (Speech Verification System) 40 for the determination of hidden Markov models and the selection of a "cohort" for the new subscriber. SVS 40, which may be, for example, the DSP 3 system available from AT&T, includes Real Time Host (RTH) controller 41 and a plurality of DSPs (Digital Signal Processors) 42-1 through 42-P. Illustratively, P=128. RTH 41 serves as an interface between DSPs 42-1 through 42-P and an external processor, such as controller 45, such that, upon receipt of a speech processing request, RTH 41 determines which one of the DSPs 42-1 through 42-P is available (idle) and passes the request thereto along with the accompanying data. Assuming that DSP 42-1 is idle, then RTH 41 passes the eleven digit strings and corresponding feature vectors of autocorrelation coefficients to DSP 42-1 for processing.

A flow diagram of illustrative processes by which DSP 42-1 generates HMMs and selects a cohort is presented in FIGS. 4a–d.

Figure 4A:
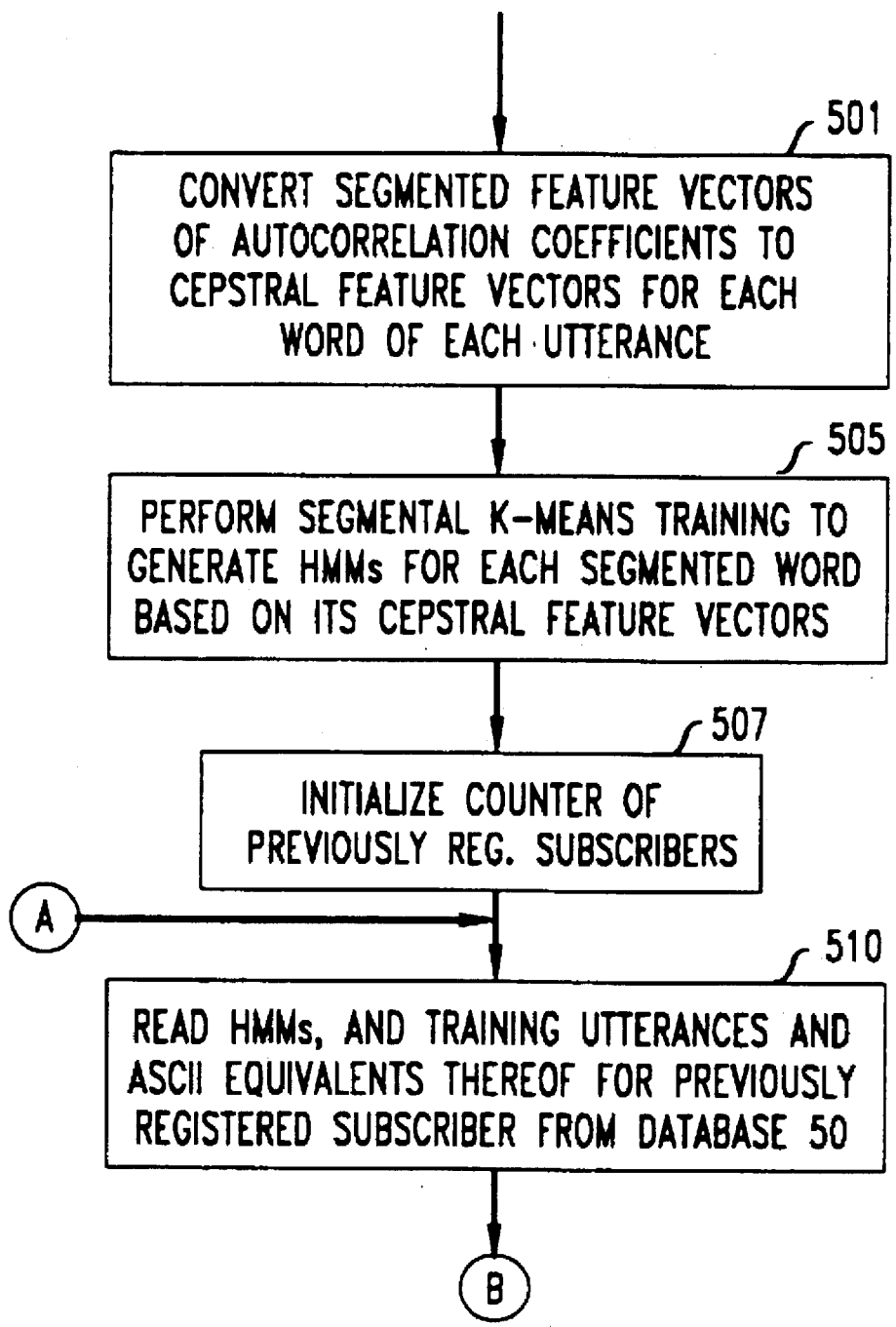
FIGS. 4a–d present a flow chart of the operation of a speech verification system as it concerns training of hidden Markov models and the selection of a cohort for a speaker.

As shown in FIG. 4a at step 501, DSP 42-1 converts feature vectors of autocorrelation coefficients into feature vectors of 12 cepstral and 12 delta cepstral coefficients. The 12 delta-cepstral coefficients are calculated by fitting a regression line to a sequence of five cepstral coefficients centered around each current cepstral coefficient. As before with the feature vectors of autocorrelation coefficients, each feature vector of cepstral coefficients characterizes a 15 ms time-slice of a subscriber's utterance. The above-described conversion of autocorrelation coefficients to cepstral coefficients is well-known in the art and is described in further detail in the above incorporated reference by C.-H. Lee, et al., *Acoustic Modeling for Large Vocabulary Speech Recognition*, 4 Computer Speech and Language 127–65 (1990).

Next, as shown at step 505, DSP 42-1 generates a so-called Hidden Markov Model (HMM) characterizing the new subscriber's utterance of the digit zero, in which the HMM is generated based on the associated cepstral coefficient feature vector characterizing the digit zero for each occurrence of that digit in the eleven strings of digits. Similarly, DSP 42-1 generates an HMM characterizing each of the other digits, i.e., digits 1 through 9 and the digit zero as "oh", if present.

In the illustrative embodiment of the present invention, each digit is represented by an eight state HMM. The nominal number of mixture components per state, M, is six, but the actual number can be less depending on the number of feature vectors segmented in each state.

In addition to the HMMs mentioned above, HMMs representing two kinds of non-speech segments are provided by the embodiment. These are a one state "silence" model, trained from background segments in the registration procedure, and a three state artifact model, trained from speaker generated non-speech sounds, such as "puff" and "click" sounds.

Each HMM generated by DSP 42-1 is a left-m-right continuous density HMM of the type described in U.S. Pat. No. 4,783,804, commonly assigned herewith and incorporated by reference as if fully set forth herein. The spectral observation probability for each state of an HMM is a continuous density probability function specified as a mixture of M Gaussian densities. The parameters of the mth mixture component for the jth state of an HMM are the mean vector, $\mu_{jm}$, the covariance matrix, $U_{jm}$, and the mixture component weight, $c_{jm}$. Matrix $U_{jm}$ is a fixed diagonal covariance matrix. The state-transition probabilities, $a_{ij}$, of an HMM are fixed such that the probabilities for remaining in the same state and advancing to the next state are equal.

DSP 42-1 estimates HMM parameters (at step 505) by a conventional segmental K-means training procedure, such as that described by Rabiner et al., *A Segmental K-Means Training Procedure for Connected Word Recognition*, Vol. 65, No. 3 AT&T Technical Journal 21–31 (May–June 1986), which is hereby incorporated by reference as if fully set forth herein. In addition to the model parameters, it is preferred that word duration means and variances be calculated from the subscriber's registration utterances for use in word duration penalties applied to verification scores.

These means and variances may be determined for each word contained in the training utterances. The determination of such means and variances is done in the conventional fashion, such as that described by Rabiner, Wilpon, and Juang, *A Model Based Connected-Digit Recognition System Using Either Hidden Markov Models or Templates*, 1 Computer Speech and Language, 167–97 (1986), which is hereby incorporated by reference as if set forth fully herein. These mean and variance statistics are stored as part of the training data.

Once HMMs for the new subscriber have been determined, a "cohort" for that subscriber is determined by DSP 42-1. A cohort is a set of other subscribers whose HMMs are used in the verification process for the given subscriber. These other subscribers are selected according to a cohort selection criterion. As will be discussed below, HMMs associated with a given subscriber's cohort are used to provide a speaker verification process which is more robust to changes in, e.g., the characteristics of the channel through which registration and verification utterances are communicated or overall vocal effort (or "loudness").

For example, in registering with VDCS 100, a new subscriber may use a home telephone station, S1, having a "carbon button" microphone. Such microphones have a frequency response characteristic which acts as a filter of the speech utterance communicated to the central office 225 (and eventually VDCS 100). However, when providing utterances for purposes of speaker verification as part of VDCS 100 use, the subscriber may use another station having a different microphone, e.g., an electret. The frequency response of an electret microphone differs significantly from that of a carbon button microphone, therefore providing a different filtering effect to the speech utterance of the subscriber. Under such circumstances, the characteristics of the channel—which include the microphone characteristics—through which the subscriber's uuerances are communicated may change significantly. The accuracy of a speaker verification system in terms of both true speaker rejection rate (the so-called "Type I" error) and imposter acceptance rate (the so-called "Type II" error) degrades when registration (i.e., training) and verification utterances are exposed to disparate channel characteristics. The use of cohorts in the verification process helps alleviate the accuracy problems caused by such disparate channel characteristics.

According to an illustrative cohort selection criterion, a cohort is a set of K other subscribers whose HMMs (previously determined) are closest to or "most competitive" with those of the subscriber in question. A cohort for a new subscriber may be determined by DSP 42-1 through pairwise comparisons of the subscriber's registration utterances to the HMMs of each of a plurality of (e.g., all) other subscribers, and vice-versa, using conventional Viterbi scoring.

The cohort for the new subscriber is determined as shown at steps 507–575 of FIGS. 4a–d. At step 507, a counter for keeping track of previously registered subscribers (i.e., so that their utterances and HMMs may be addressed) is initialized. The counter therefore points to the first of a plurality of previously registered subscribers to be considered for membership in a new subscriber's cohort. Next, at step 510, the HMMs and training utterances for the first previously registered subscriber to be considered are retrieved from database 50. The retrieved HMMs are for use in comparison to training utterances of the new subscriber. The retrieved training utterances are for use in comparison to the HMMs of the new subscriber.

Figure 4B:
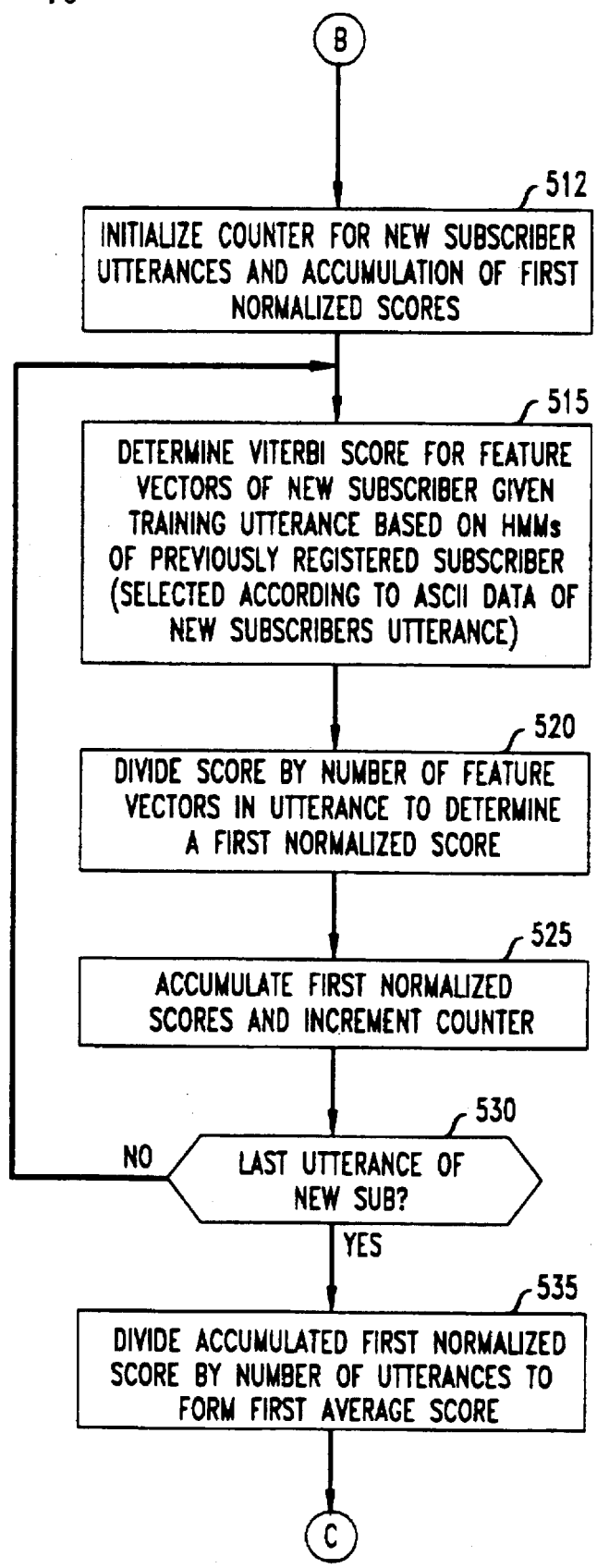

The comparison of HMMs to training utterances of the new subscriber begins by the initialization of a counter at step 512 in FIG. 4b. This counter points to the first new subscriber utterance to be compared with the HMMs of the previously registered subscriber. Conventional Viterbi scoring is used for this comparison at step 515. The scoring measures the likelihood of the utterance given the HMMs of the previously registered subscriber. The previously registered subscriber's HMMs are selected for use in the scoring process based on an ASCII representation of the new subscriber utterance as provided by SIU 21. At step 520, the score for a given utterance produced at step 515 is divided by the number of feature vectors which make up the utterance. This division produces a first normalized score. The first normalized score is saved in an accumulator of DSP 42-1 at step 525 for later use. Steps 515, 520, and 525 are repeated for each training utterance of the new subscriber until the last such utterance has been scored as determined by decision step 530. When all the training utterances have been scored, the total accumulated first normalized score determined at step 525 is divided by the total number of scored utterances at step 535 to form a first average score.

Figure 4C:
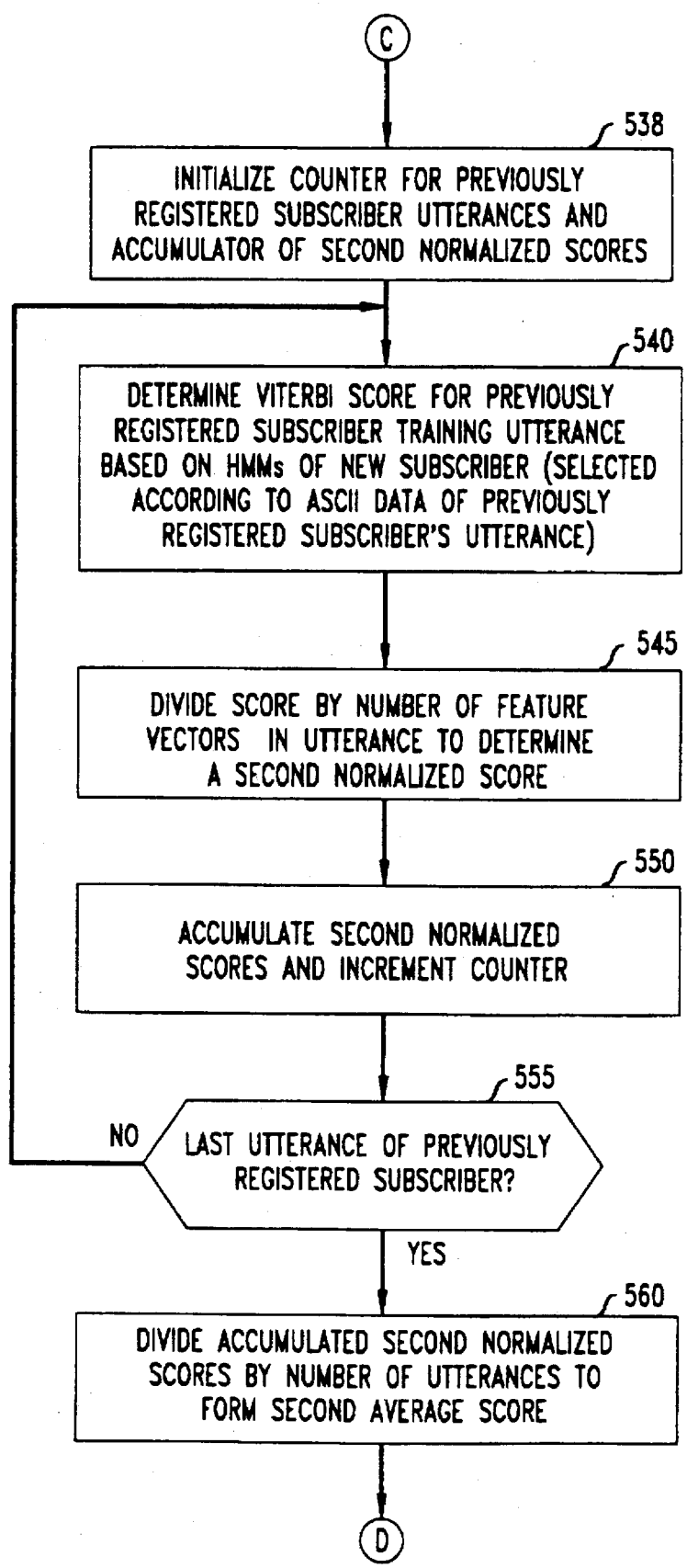

Process steps 538–560 are next performed as shown in FIG. 4c. These steps are similar to steps 512–535 discussed above. Steps 538–560 determine a second average score based on comparisons of the training utterances of the previously registered subscriber in question and HMMs of the new subscriber. ASCII representations of previously registered subscriber utterances from database 50 are used to select HMMs of the new subscriber for the comparison.

Figure 4D:
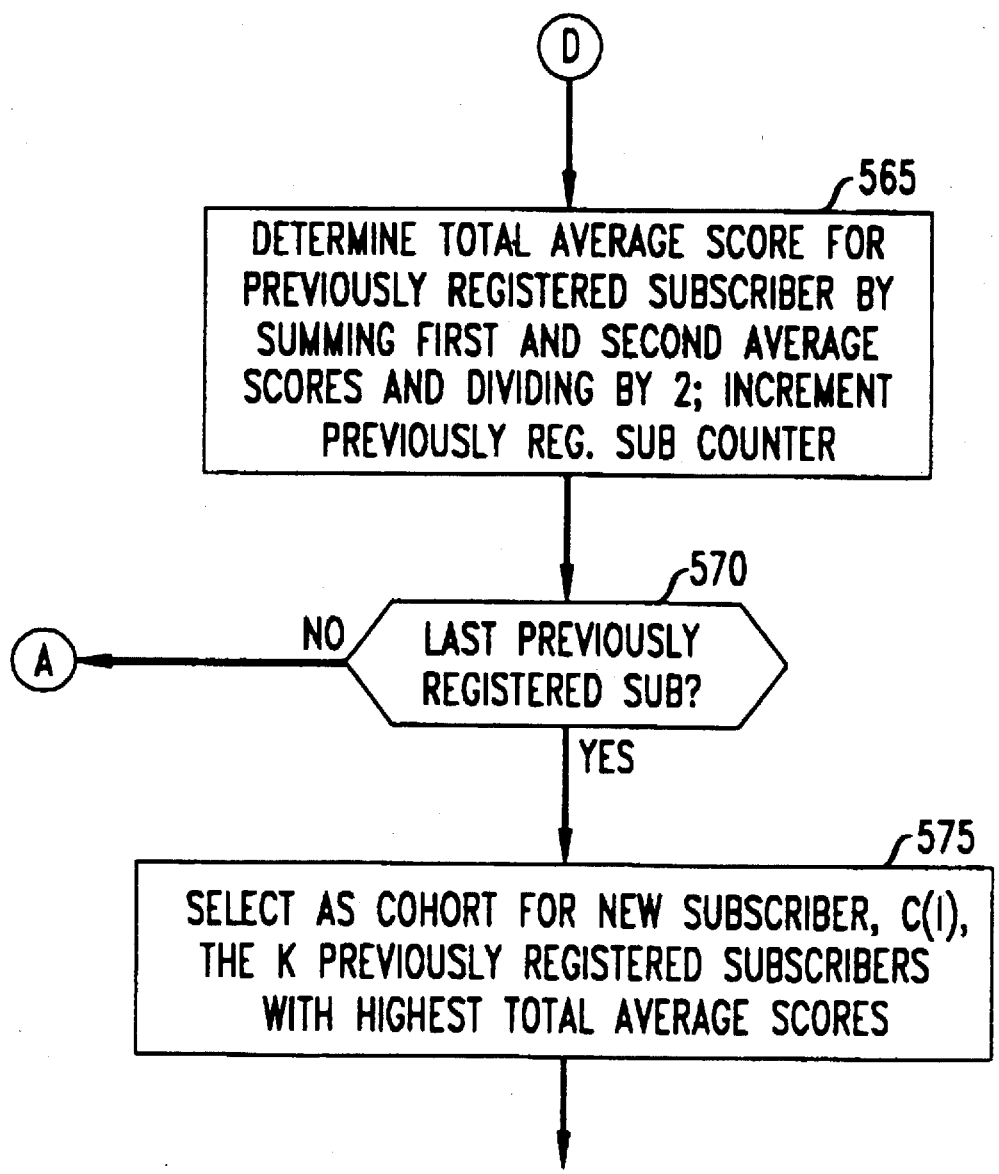

After steps 538–560 are performed, a total average score for the previously registered subscriber is determined at step 565 of FIG. 4d based on an average of the first and second average scores (determined at steps 535 and 560, respectively).

The whole process described above at steps 510–565 is repeated for each of the plurality of previously registered subscribers under the control of decision step 570. Once a total average score has been determined for each of the previously registered subscribers, a cohort may be selected for the new subscriber. The cohort is selected at step 575 as the K previously registered subscribers having the highest total average scores. Illustratively, K=5.

Note that in the embodiment described above and presented in FIGS. 4a–d, the number of utterances of each digit is equal, such that the selection of a cohort is not biased in favor of certain digit utterances.

It should be understood that the above described cohort selection process is merely illustrative. Other techniques for forming cohorts of a speaker are possible, including techniques which operate on a word-by-word, rather than a speaker-by-speaker, basis. One illustrative word-by-word cohort selection technique is similar to that described above, except that averages are formed for each word rather than an average speaker utterance basis. Naturally, word-by-word cohort techniques may require more storage space as there is a distinct cohort for each word of a speaker, rather than for each speaker. Another cohort selection technique involves designating a cohort based on a random selection of previously registered subscribers.

An alternative to the above-described cohort selection techniques is one which employs a direct comparison of the HMMs of the speaker in question, e.g., the new subscriber, with the HMMs of potential cohort members. This direct comparison of HMMs may be performed on a word-by-word or speaker-by-speaker basis. Because no speaker utterances are involved in the determination of the cohort, this technique is less computationally intensive and has less storage requirements (since utterance data need not be stored) than the techniques discussed above.

As discussed in U.S. Pat. No. 4,783,804 incorporated by reference above, the observation likelihood for a state in a continuous density HMM of a new subscriber may be characterized as a weighted sum of normal Gaussian densities:

$$b_j^{new}(O_t) = \sum_{m=1}^{M^{new}} c_{jm}^{new} N(O_t, \mu_{jm}^{new}, U_{jm}^{new}) \tag{1}$$

where $b_j^{new}(O_t)$ is the likelihood of an observation, O at a time t at state j of the HMM; N is a normal Gaussian density function; $c_{jm}^{new}$ is the "mixture" weight for the jth state and mth mixture component; $\mu_{jm}^{new}$ is the mean of the feature vectors provided during training; $U_{jm}^{new}$ is a covariance matrix for the feature vectors from training.

Similarly, the observation likelihood for a state in a continuous density HMM of a previously registered subscriber may be characterized as:

$$b_k^{pre}(O_t) = \sum_{l=1}^{M^{pre}} c_{kl}^{pre} N(O_t, \mu_{kl}^{pre}, U_{kl}^{pre}). \tag{2}$$

To determine a log likelihood similarity measure, R, between two HMMs of new and previously registered subscribers, the kth state of the previously registered subscriber's HMM and the jth state of the new subscriber's HMM are compared by substituting $\mu_{kl}$ for $O_t$ in expression (1), and using $c_{kl}^{pre}$ as a weighted representation of the prominence (or the number) of training feature vectors represented by $\mu_{kl}^{pre}$. To wit:

$$R_{kj}^{pre,new} = \sum_{l=1}^{M^{pre}} c_{kl}^{pre} \left[ \log \sum_{m=1}^{M^{new}} c_{jm}^{new} N(\mu_{kl}^{pre}, \mu_{jm}^{new}, U_{jm}^{new}) \right] \tag{3}$$

To determine an overall similarity measure between the "new" and "pre" HMMs, the state-to-state similarity measures, $R_{kj}^{pre,new}$, are accumulated over an optimal alignment of "pre" states to "new" states, as follows:

$$R^{pre,new} = \frac{1}{J^{new}} \sum_{j=1}^{J^{new}} R_{k(j),j}^{pre,new}, \tag{4}$$

where k(j) represents an optimal mapping of the "pre" state k to the "new" state j and $J^{new}$ is the number of states in the new subscriber's HMM (e.g., $J^{new}=8$). This optimal mapping is achieved in conventional fashion using a dynamic programming alignment with Itakura constraints and the first and last "pre" and "new" HMM states aligned.

The above-described technique is directly applicable to word-by-word cohort selection as a cohort for a given new subscriber's word may be determined as the K previously registered subscribers having the highest scores, $R^{pre,new}$, for the word in question. Moreover, this technique for determining cohorts may be used on a speaker-by-speaker basis by simply averaging similarity scores for individual HMMs over all HMMs called for by all registration utterances as discussed above.

As discussed illustratively above with reference to FIGS. 4a–d, determination of a cohort for a given subscriber is based upon, inter alia, HMMs of previously registered subscribers. However, it should be understood that cohorts for a given subscriber need not be determined at the time of the subscriber's registration. Cohorts for subscribers may be determined subsequently, after HMMs associated with all subscribers are determined. Also, cohorts may be updated, according to a selection criterion, over the course of time.

When DSP 42-1 completes its task, then RTH 41 passes the resulting HMMs, training staff sties, and cohort subscriber identification information to controller 45. Controller 45 then stores this information in a reference database 50 memory record that is indirectly indexed by the subscriber's account code. (It is noted that if that code is shared with another account, then controller 45 effectively "appends" the new subscriber's database 50 record to the record associated with the subscriber who is sharing the account code with the new subscriber. Similarly, controller 45 notes that fact in the latter record as discussed above.) Cohort subscriber identification information is stored as addresses of the HMMs of each subscriber of the cohort.

Controller 45 also stores in database 50 the cepstral feature vectors of the training utterances, determined by DSP 42-1, as well as the ASCII equivalents of these utterances, for the new subscriber. Following the foregoing, controller 45 stores the ASCII subword unit of indices, characterizing the new subscriber's utterance of the subscriber's labels, as well as the ASCII equivalents thereof in the aforementioned database 50 memory record. Controller 45 then notifies SIU 21 via LAN 30 that processing of the subscriber's dam has been completed. SIU 21, in turn, sends a similar message to host processor 5, which causes host 5 to disconnect SIU 21 from the subscriber's incoming call. At that point, the attendant 15 notifies the subscriber that registration has been completed.

It should be understood that the above described training of HMMs and cohort selection could occur without maintaining a connection between the new subscriber and the system 100, once the new subscriber has provided training utterances. For example, training and cohort selection could occur off-line.

At this point, a subscriber may "dial up" system 100, say his/her subscriber number, and then invoke a calling function characterized by one of the subscriber's predefined labels, such as "call home." Alternatively, the subscriber may request that a call be placed to a location that is not defined by one of the subscriber's predefined labels. That is, the subscriber may say the telephone number of a location that the subscriber desires to call. For example, the subscriber may say "908-555-6008" identifying, for example, station S2. System 100, in response thereto, decodes the subscriber's utterance of 908-555-6008 and places an outgoing call to that location and then connects the subscriber's incoming call to that outgoing call.

Specifically, the subscriber may dial the system 100 service telephone number, e.g., 1-800-838-5555, to establish a telephone connection between station S1 and system 100 via CO 225 and network 200. The system 200 destination switch, responsive to receipt of the call and called telephone number, associates that number with a particular one of its outgoing trunk groups and presents the call to system 100 via an idle trunk (port) of that group. Switch 10, responsive to receipt of the incoming call, notifies host 5 of that fact via LAN 30. Host 5, in response to such notification, directs switch 10 via LAN 30 to establish a connection between the incoming call and an idle one of the CIUs (Caller Identification Units) 20-1 through 20-N, e.g., CIU 20-1. CIUs 20-1 through 20-N are identical to SIU 21, except that the CIUs are not programmed to present the registration process to a new subscriber.

Assuming that CIU 20-1 is connected to the subscriber's call, then that CIU transmits over the connection an announcement asking the subscriber "what is your account code?" The subscriber has the option of entering his/her account code (number) by saying it or by keying it in using the station S1 keypad. If the subscriber elects the latter option and keys in his/her account code, then, CIU 20-1 collects the "keyed in" digits. Upon receipt of the last such digit, CIU 20-1 then verifies the subscriber's identity by generating and transmitting over the incoming call connection a series of randomly selected digits and then prompting the subscriber to say the series of digits.

If the subscriber says his/her account code, then, similarly, CIU 20-1 collects the subscriber's utterances and uses connected digit processing to segment the utterances into speech signals characterizing respective digits of the account code. CIU 20-1 then converts each such speech segment into autocorrelation coefficients and then identifies the account code, but not the caller, based on those coefficients. The account code is identified with conventional speaker-independent connected digit speech recognition well known in the art. CIU 20-1 then stores the account code in its local memory. (If the subscriber entered the account code via the station S1 keypad, then CIU 20-1 decodes the resulting series of tones (i.e., Dual Tone MultiFrequency signals, i.e., DTMF signals) into respective digit values and stores them as the account code. Then, as mentioned above, CIU 20-1 transmits the series of random digits and requests that the subscriber repeat those digits. Similarly, CIU 20-1 segments and models the caller's response as feature vectors of autocorrelation coefficients.)

Following the foregoing, CIU 20-1 sends a message containing the received account code and the feature vectors representing the caller's (subscriber's) spoken account code (or random digits, as the case may be) to controller 45 in order to verify the caller's identity. Controller 45, in response thereto and using the received account code as a memory index, unloads from reference database, or memory, 50 the record containing the Hidden Markov Models (HMM) of the subscriber's utterances of the respective digits forming the associated account code and the HMMs associated with the cohort of the subscriber identified with the account code. Controller 45 then sends via bus 46 the unloaded HMMs and feature vectors generated by CIU 20-1 to RTH 41 for the purpose of verifying that the subscriber HMMs and feature vectors represent speech signals spoken by the same person. (It is noted that if the feature vectors represent the random digits, then controller 45 sends only the HMMs priorly stored for those digits for both the subscriber and the cohort.)

RTH 41, in response to the request, identifies an idle one of its associated DSPs 41-1 through 42-P, e.g., DSP 42-P, and supplies the HMMs and feature vectors of autocorrelation coefficients received from controller 45 to DSP 42-P. DSP 42-P operates in accordance with the flow diagram presented in FIG. 5.

Figure 5:
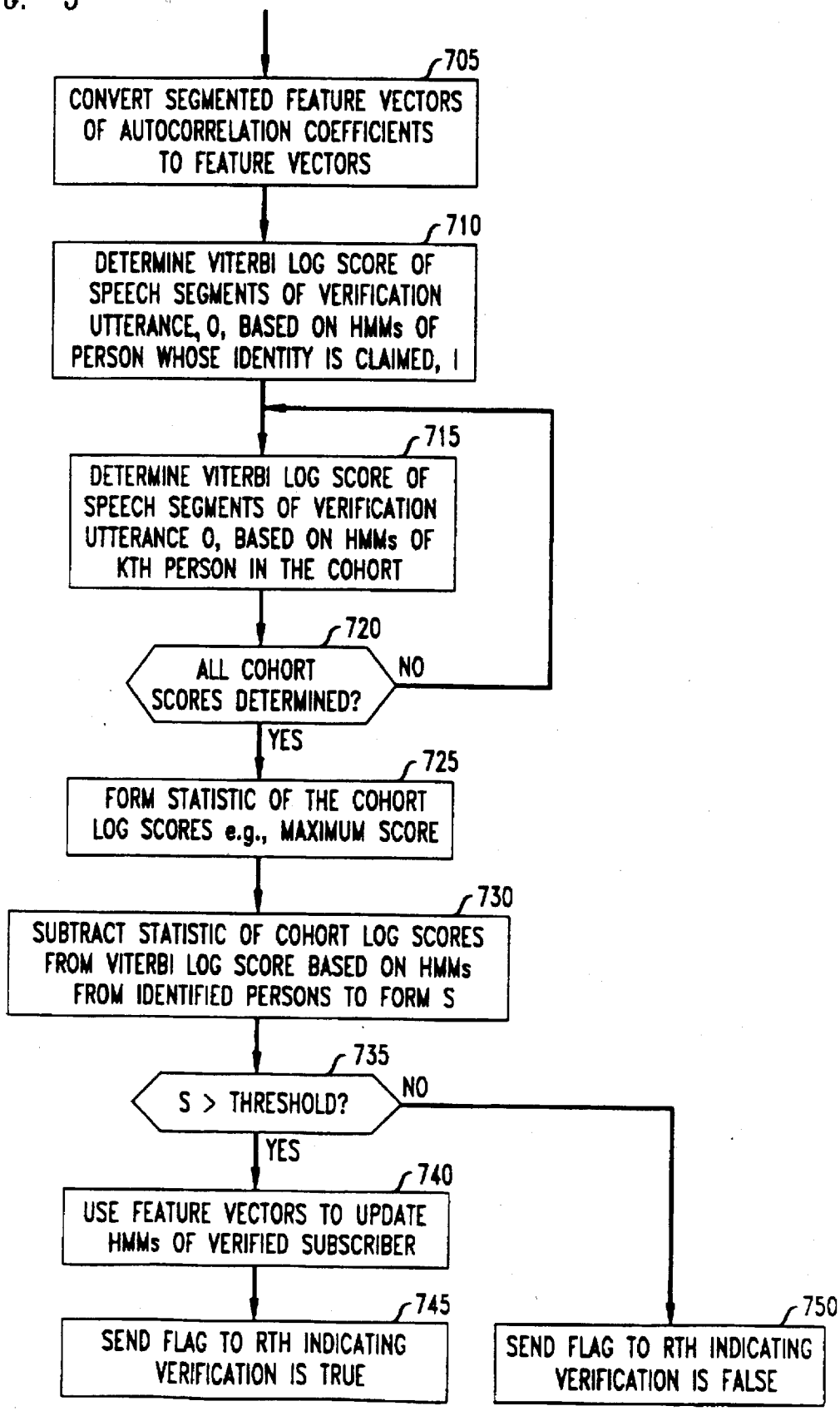
FIG. 5 is a flow chart of the operation of the speech verification system as it concerns speaker verification using cohorts.

As shown at step 705 of FIG. 5, DSP 42-P converts the feature vectors of autocorrelation coefficients to feature vectors of cepstrum and delta-cepstrum coefficients as described above.

Next, DSP 42-P compares the feature vectors of cepstral coefficients (representing, e.g., the spoken random digit verification utterance) to the HMMs of the claimed subscriber and his/her cohort. This comparison is presented at steps 710–745 of FIG. 5. The comparison produces a score indicative of the likelihood that the verification utterance was spoken by the claimed subscriber (for purposes of verification, scores are based on HMMs of speech sounds not those representing non-speech sounds). The score, S, is determined by DSP 42-P according to the following expression (see step 730):

$$S = \log \hat{p}(O/I) - \underset{k}{\text{stat}} [\log \hat{p}(O/C_k(I))]. \quad (5)$$

The likelihood $\hat{p}$ is evaluated by DSP 42-P using a frame-synchronous Viterbi likelihood scoring procedure well-known in the art and described, e.g., by Lee and Rabiner, *A Frame-Synchronous Network Search Algorithm for Connected Word Recognition*, 37 IEEE Trans. Acoust., Speech, and Sig. Pro. 1649–58 (November 1989). The quantity $\hat{p}(O/I)$ represents likelihood that an observed set of feature vectors, O, was produced by a claimed individual, I, as represented by HMMs trained by that individual (see step 710). The quantity $\hat{p}(O/C_k(I))$ represents the likelihood that an observed set of feature vectors, O, was produced by the kth member of the cohort associated with individual I, $C_k(I)$ (see steps 715–720). The term "stat[*]" refers to a statistical operator, such as a minimum, maximum, or average likelihood over all subscribers who make up the cohort (there are K subscribers in the cohort). Illustratively, the statistical operator is the maximum (see step 725).

When DSP 42-P determines the value of S to be greater than a threshold, the claimed identity of a subscriber will be accepted (see steps 735–745). As a result of being accepted, the feature vectors of cepstrum and delta-cepstrum coefficients may be used to "update" (or further train) the HMMs of the claimed and verified subscriber (see step 740). Given feature vectors, $O_{jm}(t)$, t=1, 2, ..., $T_{jm}$, decoded in a state j matching mixture component m best, then the HMM mean, $\mu_{jm}$, and component weight, $c_{jm}$, are updated by DSP 42-P as follows:

$$\hat{\mu}_{jm} = \frac{N_{jm}\mu_{jm} + \sum_{t=1}^{T_{jm}} O_{jm}(t)}{N_{jm} + T_{jm}} \quad (6)$$

and $$\hat{c}_{jm} = \frac{N_{jm} + T_{jm}}{\sum_{m=1}^{m_j} (N_{jm} + T_{jm})}, \quad (7)$$

where $N_{jm}$ is the number of training vectors used to calculate an unupdated mean and mixture component. Vector count $N_{jm}$ is then updated by DSP 42-P as follows:

$$\hat{N}_{jm} = N_{jm} + T_{jm} - \frac{\sum_{j,m} T_{jm}}{\sum_{j,m} N_{jm}} N_{jm}. \quad (8)$$

DSP 42-P then supplies updated HMMs and a flag indicating that the verification is true (i.e., positive) to RTH 41 (see step 745). RTH 41, in turn, supplies that information and the verified subscriber's account code to controller 45.

Should DSP 42-P determine the value of S to be less than or equal to the threshold, the claimed identity of a subscriber will be rejected and a flag indicating a false (i.e. negative) verification is sent to RTH 41 (see steps 735, 750). No updating of a subscriber's HMM by DSP 42-P will occur under these circumstances. Controller 45 is supplied with the negative verification information.

Illustratively, a static threshold may be used. Such a threshold may be set equal to zero, or biased above or below zero for a system which is less or more tolerant of imposters, respectively. However, a dynamic threshold may also be used. Such a threshold may be determined according to conventional thresholding techniques for speaker verification to achieve a desired level of performance. See, e.g., Rosenberg, *Evaluation of an Automatic Speaker Verification System Over Telephone Lines*, 55 Bell System Technical Journal 723–44 (July–August 1976), which is hereby incorporated by reference as if set forth fully herein.

It should be understood that expression (5) may be used in combination with other, e.g., conventional scoring techniques. So, for example, a first scoring technique may comprise the first term on the right-hand side of expression (5). If such technique produces a score, $S_1$, which exceeds a threshold, $T_1$, then the full scoring technique of expression (5) may be used to determine a second score, $S_2$. This score, $S_2$, may then be compared to a second threshold, $T_2$. Only if $S_1 > T_1$ and $S_2 > T_2$ will a claimed identity be verified. Such a combination of scoring techniques may enhance the ability of a verification system to avoid errors caused by imposters.

The Viterbi scoring performed by DSP 42-P is constrained in conventional fashion by a grammar which allows optional non-speech segments before and after the utterance and between words. For verification phrases, it is preferred that the Viterbi likelihood scores be post-processed by application of a duration penalty to each word likelihood.

This duration penalty reflects by how much a given verification utterance word deviates from the mean for such word as determined during the registration training process. The deviation between the duration of the verification utterance word and the mean for that word is measured in terms of fractions of word duration standard deviation, as determined during registration training. The application of word duration penalties is conventional and is described in the above incorporated reference by Rabiner, Wilpon, and Juang. The likelihood $\hat{p}(O/I)$ in (5) is the average per-frame (i.e., per feature vector) likelihood of the utterance excluding the non-speech segments.

The subtraction of the statistic of the cohort log likelihood scores from the log likelihood score for the claimed individual (as presented in (5) and performed at step 730 of FIG. 5) provides a "dynamic threshold" for verification. This threshold provides significant tolerance to changing conditions. When the true speaker score is degraded by a change in conditions, e.g., changed channel conditions do to differences in microphones used in registration (training) and verification, the cohort score tends to be affected in the same way. Therefore, the difference of log likelihoods remains substantially stable and the changed conditions do not cause severe limitations on the ability of DSP 42-P to verify a claimed identity.

Controller 45, in response to the verification flag being positive, stores the updated HMMs in the subscriber's database 50 record. Controller 45 then sends the flag and default billing number to CIU 20-1. If the verification flag indicates a negative verification, then controller 45 returns a reply message indicating that fact to CIU 20-1 via LAN 30. CIU 20-1 may then terminate the call in response to that reply message or direct the call to attendant 15.

If controller 45 finds that the account code, or identifier, that it receives from CIU 20-1 is associated with a number of subscriber records, then controller 45 unloads the pertinent HMMs from each of those linked records and passes the various sets of unloaded HMMs and their respective record addresses as well as the received feature vectors of coefficients to RTH 41 for processing. RTH 41, in turn, distributes the received sets of HMMs and a copy of the feature vectors to respective idle ones of its associated DSPs 41-1 through 41-P. Each such DSP, e.g., DSP 41-1, in response thereto, generates and supplies to RTH 41 a score indicative of the level of certainty that such feature vectors compare with the set of HMMs that it receives from RTH 41. RTH 41, in turn, selects the highest score from the various scores that it receives from its associated DSPs. If RTH 41 finds that the value of the highest score greater than the threshold, then RTH 41 confirms the caller's identity and associates the caller with the subscriber record whose address is associated with the highest score. RTH 41 then causes the HMMs associated with that address to be updated in the manner discussed above and then supplies the updated HMs, the associated score and record address as well as the aforementioned positive flag to controller 45. Controller 45, in response thereto, stores the updated HMMs and returns the aforementioned reply message to CIU 20-1 and includes therein the subscriber record associated with the aforementioned highest score. If, on the other hand, RTH 41 finds that the value of the highest score to be less than or equal to the threshold, then RTH 41 notifies controller 45 of that fact. Similarly, controller 45 returns a message indicative of that fact to CIU 20-1, as discussed above.

Assuming that the controller 45 reply message is positive, then CIU 20-1 transmits over the call connection an announcement requesting e.g., "what number do you wish to call?" The subscriber may respond to that request by (a) using the station S1 keypad to "key in" a particular telephone number that the subscriber desires to call, e.g., 908-555-1234; (b) keying in one of the subscriber's predefined speed dialing codes, e.g., 231#, (c) saying the particular telephone number that the subscriber desires to call; or (d) saying one of the subscriber's predefined calling labels, e.g., "call home" or "call office."

In particular, CIU 20-1, responsive to receipt of DTMF signals characterizing a telephone number decodes those signals into respective digits in the order that the signals are received via switch 10 and network 200. Upon the decoding of the last of such telephone digits, CIU 20-1 sends a message containing the subscriber's account code and the received telephone number to host computer 5. Host computer 5 then generates and stores in its internal memory a billing record containing, inter alia, (a) the subscriber's service number and billing telephone number (e.g., home telephone number), (b) the telephone number that is being called and (c) current date and time. Host 5 then directs switch 10 to place an outbound telephone call via network 200 and outpulse the called telephone number. Host 5 also directs switch 10 to connect the subscriber's incoming call to the outbound call CIU 20-1 remains bridged onto the subscriber's incoming call as a means of detecting the subscriber's possible request for a telephone operator. That is, each of the CIUs 20-1 through 20-N using the well-known functionality of independent speech recognition may spot a caller saying "operator". Accordingly, if CIU 20-1 "spots" the subscribers saying the word "operator" during the processing of an associated call, then CIU 20-1 sends a message to that effect to host 5 via LAN 30. Host 5, in turn, connects the subscriber to an available attendant position 15 via switch 10. However, a CIU does not respond to the word "operator" once an associated call has been completed. At that point, the subscriber may enter particular signals, e.g., the pound (#) sign, as a way of requesting the assistance of an operator. That is, if switch 10 detects those particular signals after the call has been completed, then switch 10 sends the operator request message to host 5. Alternatively, the subscriber, at any point during the current call, may enter particular signals, e.g., **9, as a way of entering a request to place another call Thus, if switch 10 detects the entry of those signals, then it passes a message indicative thereof to Host 5. Host 5, in turn, terminates the outbound switch 10 connection and then asks the caller to enter a calling destination.

If, on the other hand, the subscriber keys in one of the subscriber's speed dialing codes, e.g., 231#, then CIU 20-1 upon the receipt and decoding of the signals characterizing that code sends a message to controller 45 requesting the telephone number associated with the speed dialing code entered by the subscriber. Controller 45, upon receipt of the message, interrogates the subscriber's profile record stored in database 50 to obtain the requested telephone number. Controller 45, in turn, unloads the telephone number from database 50 and sends the number, the associated speed dialing code and subscriber's account code number to CIU 20-1 via LAN 30. CIU 20-1, in turn, sends a call request message containing that telephone number, as well as a request to establish a telephone connection thereto, to host 5. Host 5, in turn, establishes a billing record and then places a telephone call to the desired telephone number via switch 10 and network 200.

Alternatively, the subscriber may say the desired telephone number, e.g., 908-555-1234. If the subscriber does so, then CIU 20-1, using connected digit segmentation, segments the subscriber's speech signals characterizing the digits of that telephone number and then models such speech segments into the aforementioned feature vectors of coefficients, as mentioned above. Based on those feature vectors, CIU 20-1 is able to interpret (identify) the digits spoken by the subscriber. Such interpretation is commonly referred to as speaker-independent, automatic speech recognition. Accordingly, as a result of such interpretation, CIU 20-1 identifies the digits forming the spoken telephone number. Similarly, CIU 20-1 then packages those digits into a call request message and sends the message to host 5 via LAN 30. Host 5, in response to receipt of that message, establishes an associated billing record and places a telephone call to the received telephone number, as discussed above.

As another alternative, the subscriber may say a calling label, e.g., "call office" previously defined by the subscriber. CIU 20-1 responsive thereto generates the aforementioned subword unit indices from the subscriber's speech signals characterizing that label. Then, as mentioned above, CIU 20-1 compares the generated series of indices with the subword unit indices of the subscriber's labels priorly stored in database 50 as discussed above.

Accordingly, if CIU 20-1 identifies the telephone number associated with the spoken label, then CIU 20-1 forms a call request message containing, inter alia, the identified telephone number and sends the message to host 5. Host 5, in turn, places the requested telephone call in the manner discussed above. Each CIU 20-1 through 20-N is arranged to detect a particular keyword, e.g., the word "cancel", which a subscriber may utter to cancel a telephone number that the subscriber is entering. For example, if the subscriber says the word "cancel" after having entered a number of digits of a telephone number, then the CIU serving the call, e.g., CIU 20-1, in response to detecting that utterance (using speaker independent speech recognition to spot that word as discussed above) discards the received digits and retransmits the aforementioned announcement.

It can be appreciated that SVS 40 expends an appreciable amount of processing time processing the subscriber's spoken account code. To speed up that processing so that a reply may be returned to controller 45 as soon as possible, RTH 41 may be arranged so that it divides the digits forming the account code among a number of idle DSPs 42-1 through 42-P. For example, RTH 41 could supply the spoken digits to respective idle DSPs 42-1 through 42-P as well as the associated HMMs stored in database 50. Accordingly, if nine such DSPs are idle, then each of those DSPs would process one digit of the account code.

Figure 6:
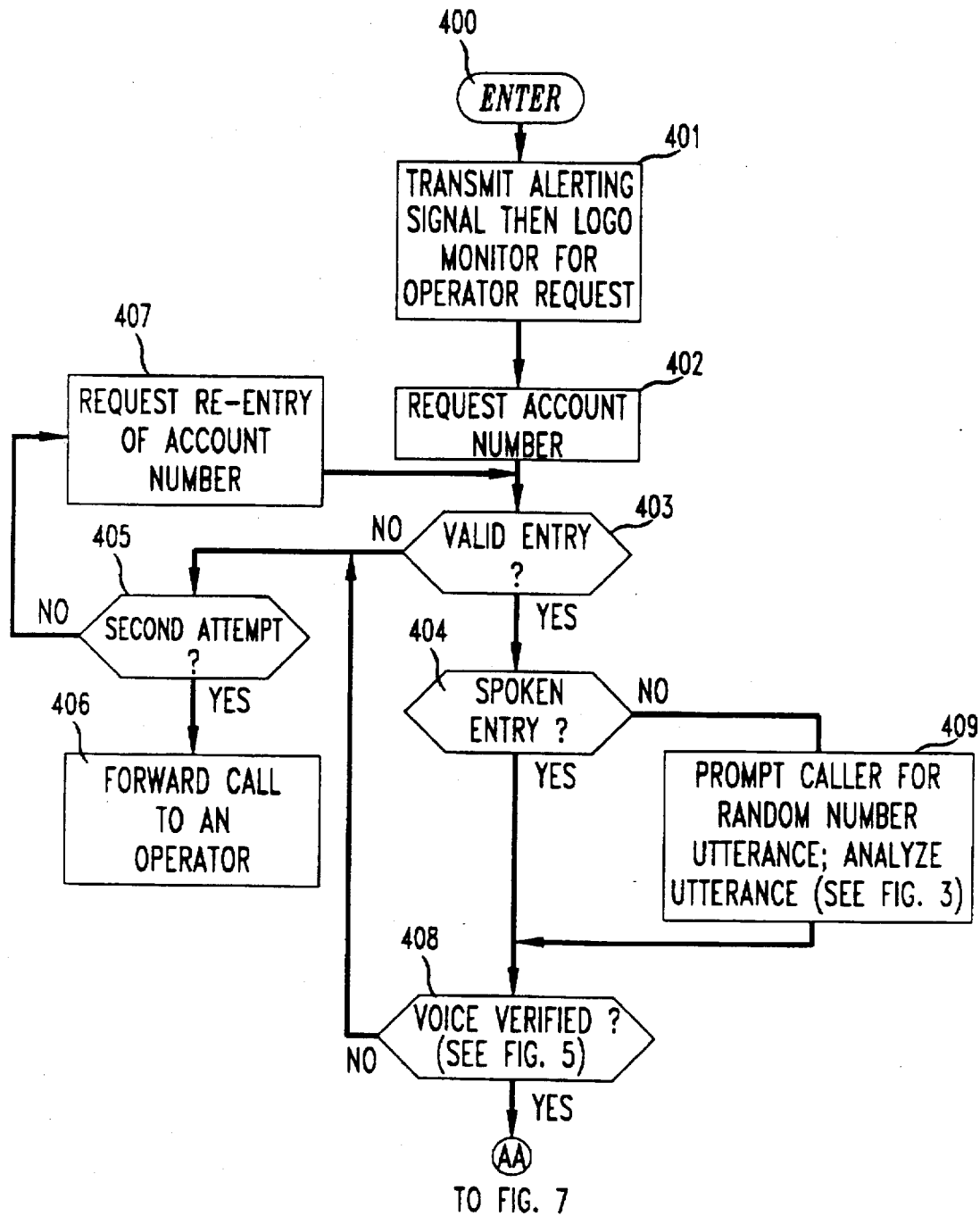
FIGS. 6–8 is a flow chart of a program which implements the invention in the system of FIG. 1.
Figure 7:
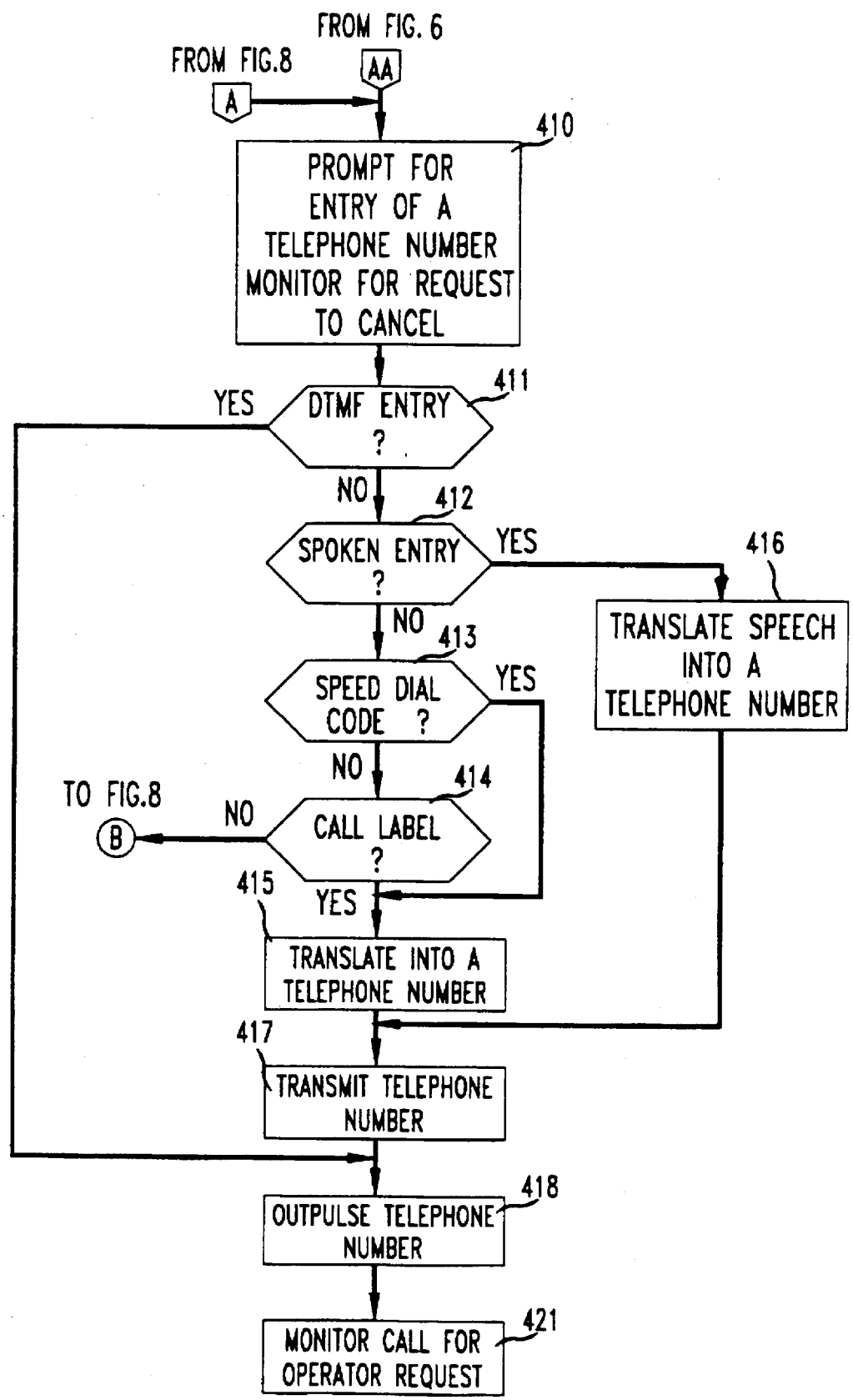
Figure 8:
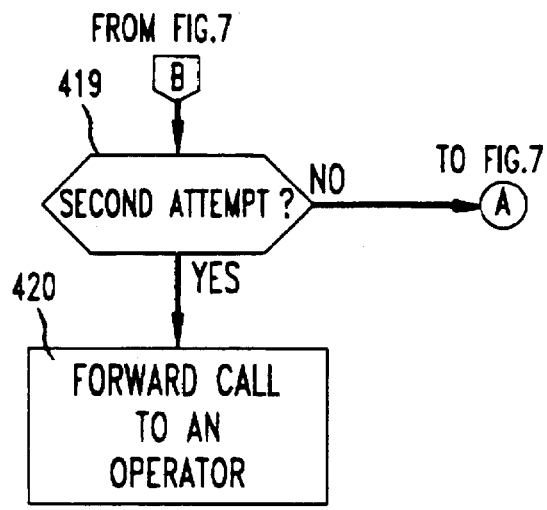
Figure 9:
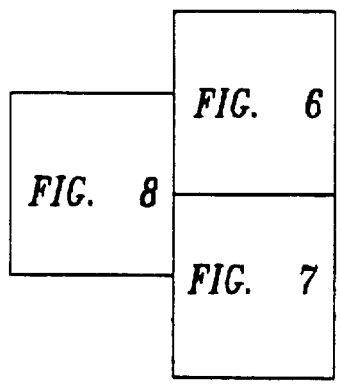
FIG. 9 shows the manner in which FIGS. 6–8 should be arranged with respect to one another.
Figure 15:
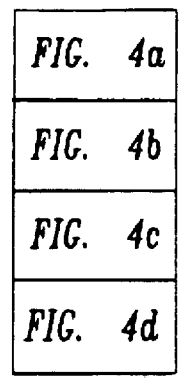
FIG. 15 shows the manner in which FIGS. 4a–d should be arranged with respect to one another.

Turning now to FIGS. 6–8, there is shown in flow chart form a program for implementing the operation of system 100. Specifically, the program is entered at block 400 in response to a new call received via switch 10. At block 400, the program proceeds to block 401 where it transmits a brief service-alerting signal, e.g., a tone, and then transmits a service name announcement, e.g., "Voice Direct". At that point, the program begins to monitor the call for receipt of the word "operator" or the word "cancel" and proceeds in the manner discussed above if it happens to receive either word. The program then proceeds to block 402 where it prompts the caller to enter his/her account code (identifier). The caller, in response to the prompt, may either say the digits forming his/her account or enter the digits via the touch-tone keypad of the caller's telephone station set. At block 403, the program determines if a customer record associated with the entered account number is stored in database 50 (FIG. 1). If the determination turns out to be true, then the program proceeds to block 404. Otherwise, the program proceeds to block 405.

At block 405, the program checks to see if the caller's second attempt to enter a valid account code also failed and forwards the call to an operator via block 406 if that is the case. Otherwise, the program proceeds to block 407 where it again prompts the caller to enter his/her account code.

At block 404, the program checks to see if the entered account code is characterized by speech signals (i.e., the caller spoke the numbers) and proceeds to block 408 if that is case. Otherwise, the program proceeds to block 409 where it prompts the caller to repeat (say) a series of random numbers. The program collects the caller's response thereto, analyzes the response to produce feature vectors characterizing the response as discussed above with reference to FIG. 3 and proceeds to block 408. At block 408, the program verifies the caller's identity as discussed above with reference to FIG. 5. If the caller's speech cannot be verified, then the program proceeds to 407. Otherwise, the program proceeds to block 410 where it prompts the caller to enter a called destination. As mentioned above, a caller may place a call by (a) saying a telephone number or call label or (b) entering the telephone number or speed dial code via the keypad of the caller's station set, e.g., station S1. The program then waits for an entry and proceeds to block 411 upon receipt thereof. At block 411, the program proceeds to block 418 if it finds that the caller entered a telephone number using the station set keypad (i.e., the number is characterized by respective DTMF tones). If that is not the case, then the program proceeds to block 412 to determine if the caller spoke the telephone number. If the latter determination turns out to be true, then the program proceeds to block 416 where it causes the associated CIU to translate the caller's speech signals into a telephone number (as discussed above) and then proceeds to block 417. If the determination at block 412 turns out to be false, then the program proceeds to block 413 to determine if the caller entered a speed dial code. If the program finds that the caller did not enter a speed dial code, then it proceeds to block 414 to determine if the caller entered a spoken call label. If the program finds that the caller entered either a speed dial code or a call label, then the program proceeds to block 415 where it causes SVS 40 to translate the caller's entry into a telephone number, as discussed above. The program then proceeds to block 417 where it transmits the resulting telephone number to the caller and then proceeds to block 418 where it causes the telephone number to be outpulsed to network 200.

If the program at block 414 finds that the caller did not enter a call label, then the program proceeds to block 419 where it determines if the caller's latest entry represents a second attempt to obtain a valid entry from the caller. If that is the case, then the program forwards the call to an operator. Otherwise, the program proceeds to block 410 to again prompt for the entry of a telephone number.

At block 418, the program places via system 100 an outgoing call and then directs system 100 to connect the incoming call to the outgoing call connection. The program then proceeds to block 421 where it continues to monitor the call for receipt of a request for an operator or request to place another call. In an illustrative embodiment of the invention, the subscriber may enter such a request at any point in the processing of the call, i.e., between blocks 402 and 417, by saying the word "operator" or entering particular signals characterizing, for example, 0#, after the call has been completed, i.e., blocks 418 and 421. Similarly, the subscriber may enter **9 to enter a request to place another call.

During the recent past, a large number of telephone subscribers have subscribed to a voice messaging service, such as voice message system 300 shown in FIG. 1. In a nutshell, the functionality provided by system 300 is similar to that provided by a conventional answering machine. That is, if a system 300 subscriber, e.g., the subscriber associated with station S1, does not answer a telephone call, for whatever reason, then the calling party is invited to leave a voice message with system 300. However, unless the called subscriber places a call to system 300, he/she does not know that the calling party left a voice message with system 300. A number of voice messaging systems address that situation by causing a lamp on the subscriber's station set to be lit as a way of indicating that the subscriber has one or more voice messages waiting. System 100 takes a different approach.

In particular, if the new subscriber is associated with a voice messaging service, e.g., system 300, then, during the subscription and registration process, attendant 15 inserts in the subscriber's database 60 record and database 50 record (a) a flag indicating that the new subscriber is associated with a voice messaging service, (b) the telephone number of that service and (c) the subscriber's messaging service account code or password. Thereafter, when the new subscriber places a call to system 100 for the purpose of, e.g., placing an outgoing call, then, while an associated CIU, e.g., CIU 20-1, is processing the subscriber's call request, host 5 places via switch 10 and network 200 a call to voice messaging service 300. When that system answers the call, host 5 transmits the subscriber's telephone number, pauses for a predetermined period of time and then transmits the associated account code (password). System 300, in response to that information, transmits the status of voice messages that are stored in system 300 for the subscriber, in which such status could vary from no voice messages to a number of voice messages. In addition, host 5, after transmitting the account code, causes switch 10 to bridge the subscriber's incoming call to the telephone connection established between switch 10 and system 300 via network 200. Thus, the subscriber may be automatically presented with the status of his/her system 300 voice messages.

Figure 10:
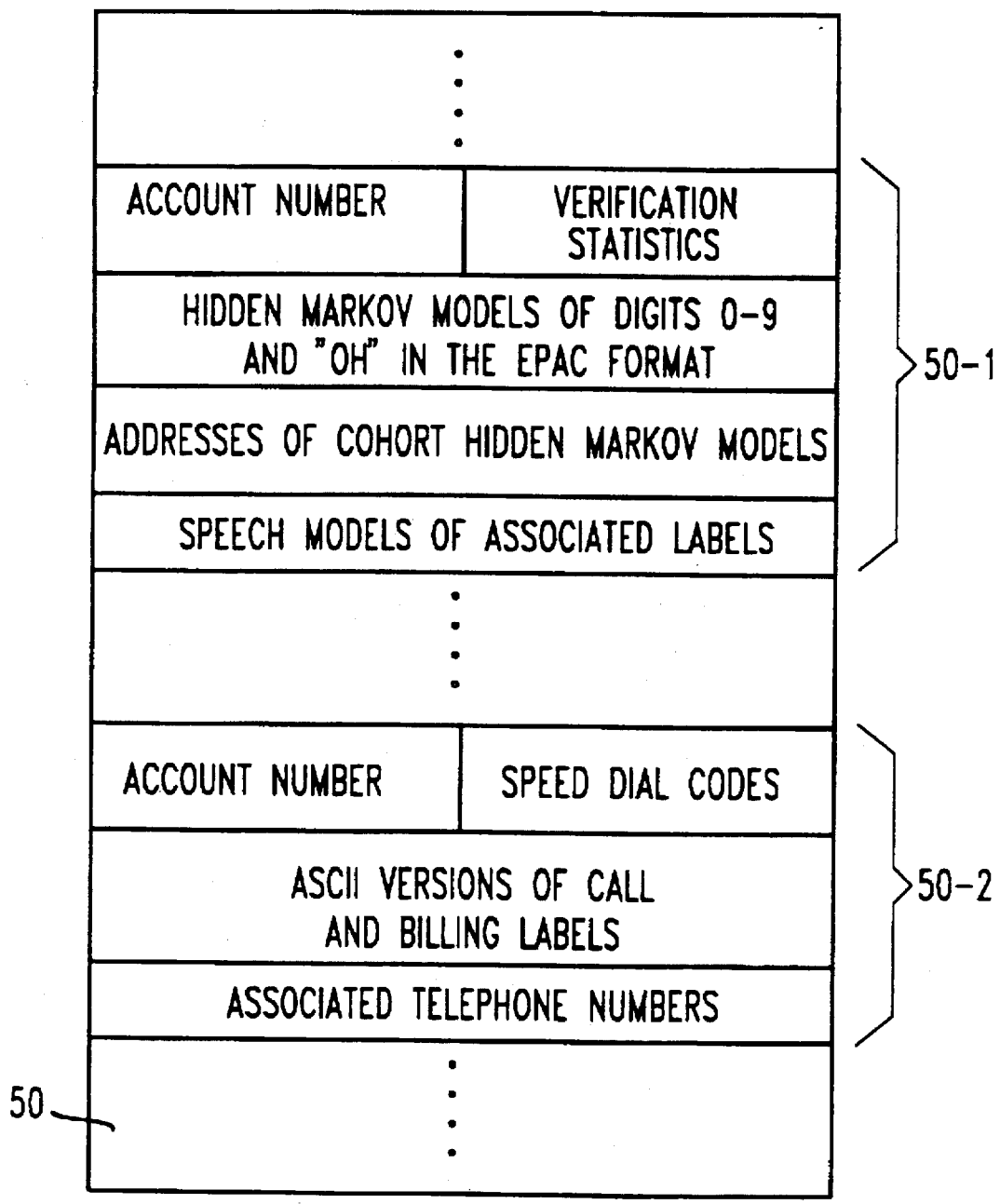
FIG. 10 is a layout of a subscriber record that is stored in the reference database of FIG. 1.

Turning now to FIG. 10, there is shown an illustrative layout of reference database 50. In particular, database 50 includes a pair of records, e.g., 50-1 and 50-2, for each system 100 subscriber. One record of the pair, e.g., record 50-1, contains the Hidden Markov models of the subscriber's speech signals characterizing the digits zero through nine (and possibly "oh"), addresses of cohort HMMs, call labels and associated billing labels. The record also contains various statistics relating to verifying the identity of a calling subscriber from his/her speech signals. For example, such statistics may be used to update associated voice templates or models and include the number of times system 100 performed such verification, number of times that such verification failed, means and variances of verification utterance word durations, and various threshold values relating to such verification and recognition of digits and labels spoken by the associated subscriber. The other record of the pair, e.g., record 50-2, contains the ASCII (text) versions of the information contained in record 50-1, as well as associated telephone numbers and speed dialing codes. It is seen from this FIG. that each such record of the pairs includes a field for the associated account code. The account code field also includes sub-fields (not shown) which are populated if the account code is shared with one or more subscribers. That is, the contents of the sub-fields link the associated record to the other records as discussed above.

Figure 11:
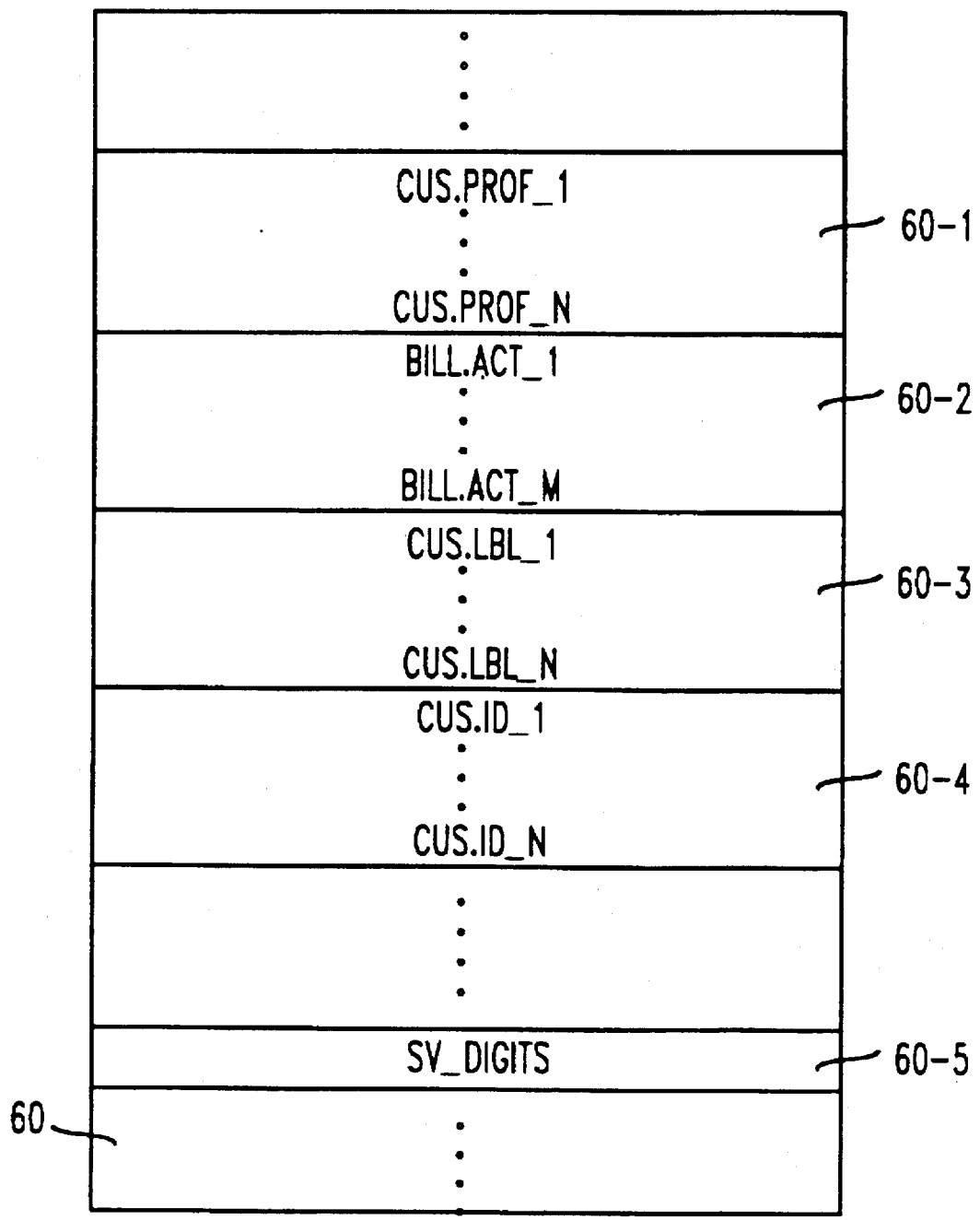
FIG. 11 shows the layout of the customer profile database of FIG. 1.

The layout of database 60 is somewhat different, as shown in FIG. 11. As mentioned above, database 60 is used for the storage of customer subscription information, in which such information is stored across a number of database 60 tables. One such table, table 60-1, is formed from a plurality of records (CUS.PROF_1 through CUS.PROF_N) each containing information specific to a respective subscriber. Such specific information includes, for example, the subscriber's name and address, account number, credit limit, default billing account number, billing address and a number of database 60 addresses (pointers) which point to entries in other tables, such as table 60-4. (The account number field also includes a number of sub-fields to link the associated with other records if the associated account code happens to be shared with other subscribers.) Table 60-4 is also formed from a plurality of records (CUS.ID_1 through CUS.ID_N) each containing information personal to a respective subscriber which is used by attendant 15 to verify the identity of a subscriber. Such identity information may include, for example, a subscriber's social security number, place of birth, mother's maiden name, etc.

Of the tables shown in the FIG., tables 60-1 and 60-3 are indexed using a subscriber's account number. Table 60-3, more particularly, is formed from a plurality of entries (CUS.LL_1 through CUS.LBL_N), in which each such entry contains the ASCII versions of call labels, associated telephone numbers, associated label billing accounts and respective billing account numbers specified by a respective subscriber. Each such billing account number, in turn, points to an entry in table 60-2, in which the entry contains conventional billing information for the associated billing account number. Such billing information includes, for example, the name and address of the entity (or person) that is to be billed for an associated call, billing cycle (e.g., monthly or quarterly), etc.

Database 60 also includes table 60-5 which contains the eleven sets of digits that system 100 uses during the training phase of a subscription, as discussed above.

Figure 12:
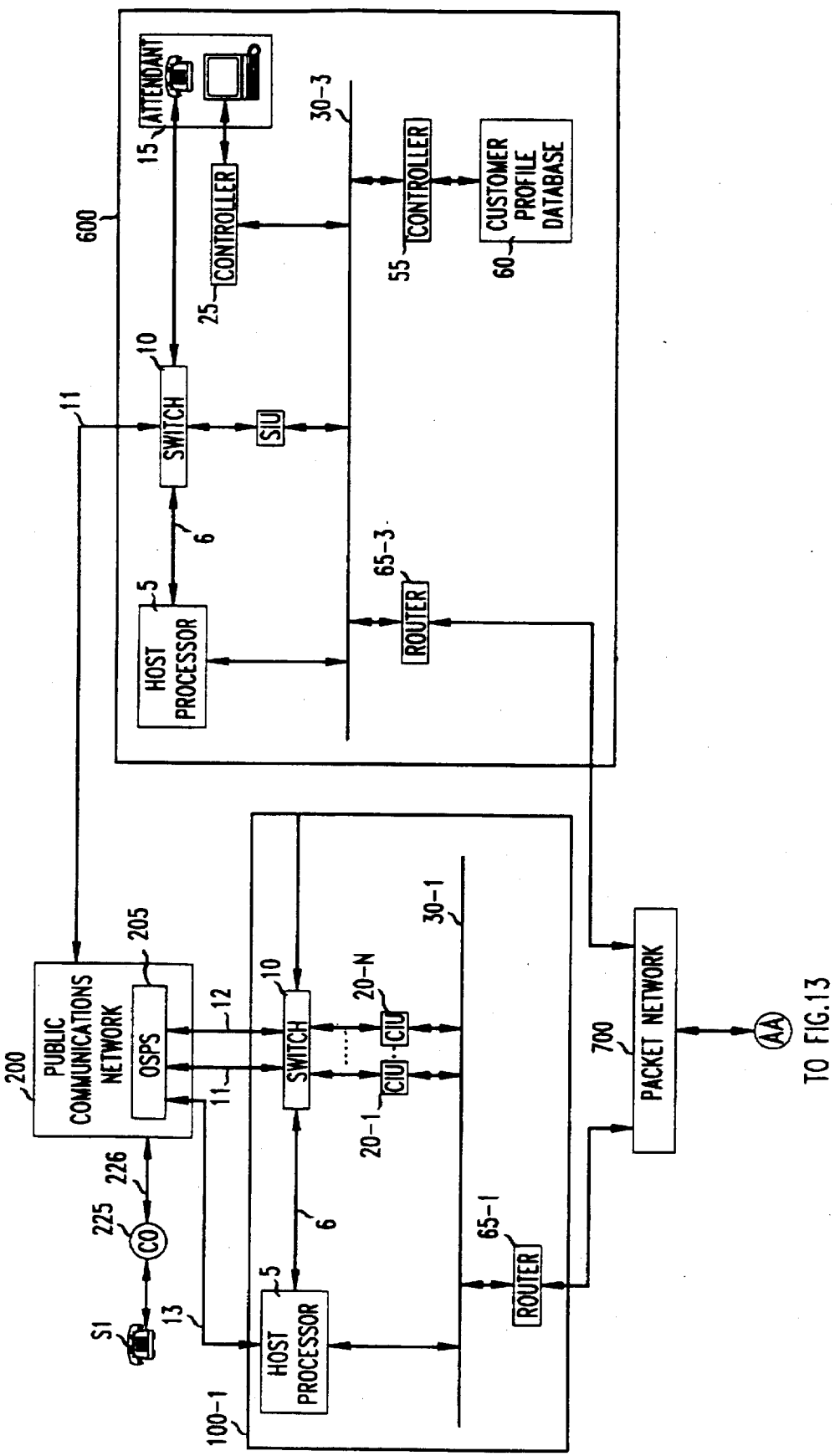
FIGS. 12 and 13 show a block diagram of an alternative embodiment of the communications system of FIG. 1.
Figure 13:
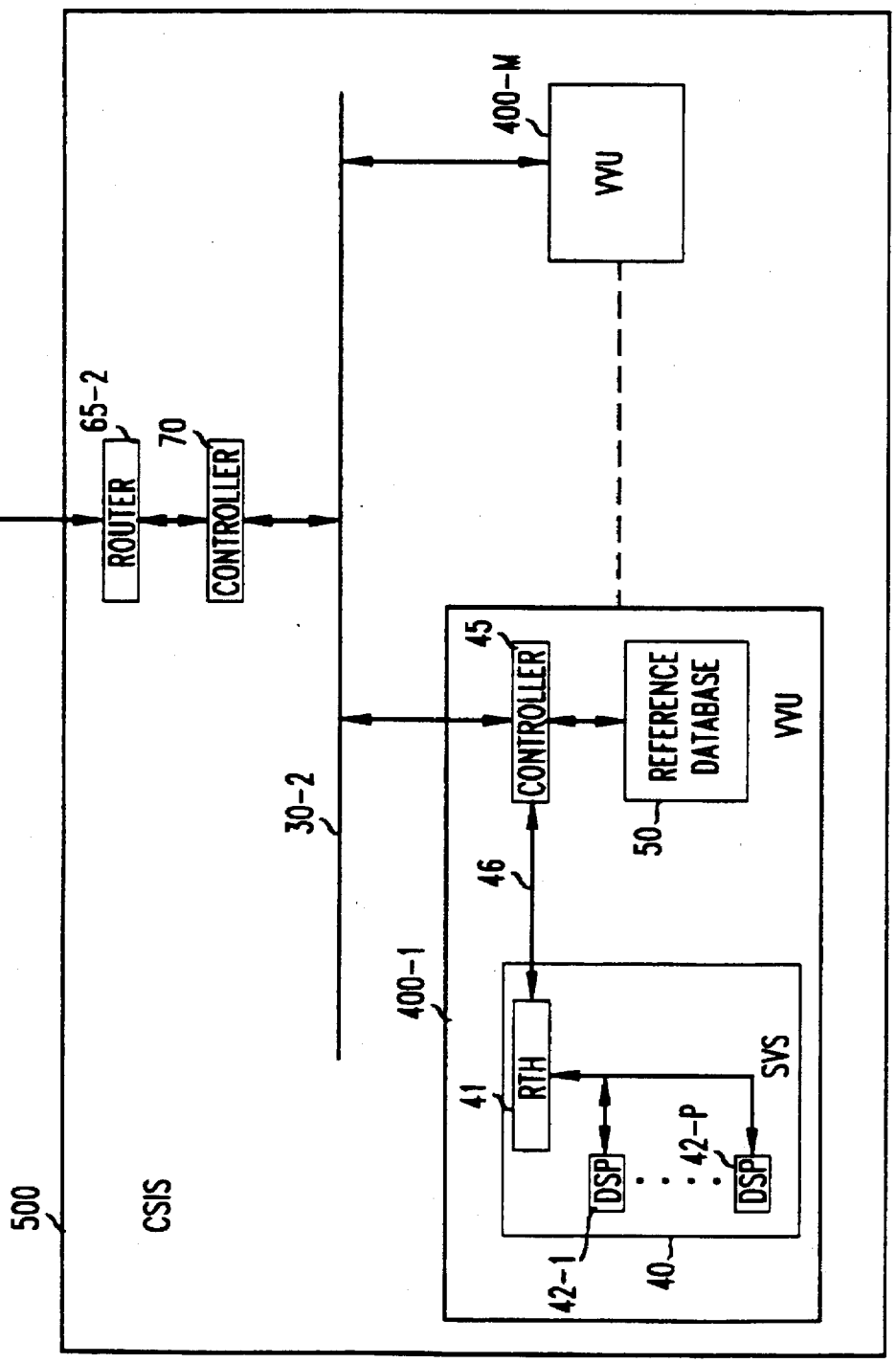

Turning now to FIGS. 12 and 13, there is shown in block diagram form an alternative embodiment, one which centralizes the subscription and speaker verification functionalities performed by system 100 of FIG. 1 and which uses a high speed frame-relay packet network to interface such functionalities with one another. Advantageously, a smaller, "stripped down" version of voice directed system 100 may be associated with each network 200 Operator Service Position System, or OSPS, one of which is shown in the FIG, namely OSPS 205. In this way, a subscriber may readily access a Voice Directed Communications System Platform (VDCSP) 100-1 via an OSPS by dialing a telephone operator access code, for example, the digits "00". If a subscriber does so, for example, the subscriber associated with statioh set S1, then CO 225 in response to receipt of those digits extends the call to network 200, which, in turn, extends the call to one of its OSPSs, e.g., OSPS 205.

OSPS 205 in response to receipt of the call presents the caller with the option of selecting a telephone operator or the services provided by VDCSP 100-1. If the subscriber selects the latter option, then OSPS 205 extends the telephone connection carrying the call to switch 10 of VDCSP 100-1. In doing so, OSPS 205 supplies to host 5 via signaling circuit 13 the identity of the trunk that is being used to connect the call to switch 10. At that point, VDSCP 100-1 under the direction of host 5 processes the call in the manner discussed above in connection with FIG. 1.

It is seen from the FIG. that smaller VDCSP 100-1 still includes host processor 5, switch 10, CIUs 20-1 through 20-N and LAN 30 which operate in the manner discussed above. It is also includes router 65-1, which may be, for example, a conventional LAN/WAN type router available from Cisco Systems Inc, Menlo Park, Calif. Router 65-1, more particularly, provides an interface between its associated modified system 100 and high-speed packet network 700, which may be, for example, AT&T's InterSpan frame relay network. That is, router 65-1 removes from LAN 30-1 a message addressed to either Central Speaker Verification System, or CSVS, 500 or subscription system 600 and formats the message into a packet so that it conforms with the well-known frame relay protocol and supplies the packet to an associated network 700 node for delivery to the intended destination. (It is noted that Routers 65-2 and 65-3 perform a similar function.)

Similarly, if the intended destination happens to be CSVS 500, then router 65-2 (which may be similar to router 65-1) receives the packet from an associated packet network 700 node, changes the format of the received packet so that it conforms with the well-known TCP/IP message protocol, and supplies the message to its associated LAN 30-2 for delivery to controller 70. (In FIGS. 12 and 13, LANs 30-1, 30-2 and 30-3 may also be the well-known Ethernet network). Controller 70, in turn, supplies the message to one of its associated Voice Verification Units, or VVU, 400-1 through 400-M based on a predetermined selection scheme, for example, the subscriber identifier (account code) contained in the message. That is, VVUs 400-1 through 400-M are associated with respective ranges of subscriber identifiers, or account codes, e.g., 500,000 identifiers. Thus, subscriber records associated with a first range of identifiers are stored in reference database 50 of VVU 400-1. Subscriber records associated with a second range of identifiers are stored in reference database 50 of VVU 400-2, and so on.

Assuming that the identifier contained in the message is within the first range of identifiers, then controller 70 supplies the message to controller 45 of VVU 400-1. (It is noted that each VVU 400-1 through 400-M operates in the manner discussed above in connection with FIG. 1.) Assuming that the message is a speaker verification request, then, as discussed above, controller 45 of VVU 400-1 (hereinafter controller 45) unloads from its associated reference database 50 the HMMs and cohort information associated with the identifier contained in the message. Controller 45 then supplies the HMMs and cohort information unloaded from database 50 and the speech models contained in the message and to associated RTH 41 for processing. Thereafter, controller 45 forms the results of such processing into a message addressed to the originator of the message received via network 700 and transmits the newly formed message over LAN 30-2. In addition, controller 45 unloads the voice templates of the calling and billing labels associated with received identifier from the associated reference database 50 and inserts those templates in the formed message that it transmits over LAN 30-2. Controller 70, in turn, removes the message from LAN 30-2 and presents it to router 65-2. Similarly, router 65-2 reformats the message from the TCP/IP protocol to the frame relay protocol and supplies the reformatted packet message(s) to its associated network 700 node for delivery to VDCSP 100-1. Similarly, router 65-1 accepts the packet message from its associated network 700 node, reformats the message(s) so that it conforms with the TCP/IP protocol and supplies the results to LAN 30-1 for delivery to a particular one of the VDCSP 100-1 elements, e.g., CIU 20-1. CIU 20-1, in turn, unloads the verifications results from the message and proceeds in the manner discussed above. CIU 20-1 also unloads the aforementioned templates and stores them in its local memory. Armed with those templates, CIU 20-1 may then process itself the associated calling subscriber's utterance of a calling label and/or billing label, thereby eliminating the need of having to perform that functionality in conjunction with CSVS 500 via network 700.

It is seen from the FIG. that the subscription section of system 100 (FIG. 1) discussed above, now forms subscription system 600. Subscription system 600, like system 100, includes attendant position 15 (representing a plurality of such positions), host 5, switch 10, SIU 21, controllers 25 and 55 and database 60 which cooperate with one another in the manner discussed above in connection with FIG. 1. Subscription system 600 still interacts with a controller 45 in the manner discussed above. However, such interaction is now via its associated router 65-3 and network 700.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A method of verifying a claim of identity made by an individual based on a signal representing an utterance provided by the individual, the method comprising the steps of:
   a. analyzing the signal representing the utterance to form a plurality of feature signals characterizing the utterance;
   b. forming a first likelihood signal, based on the plurality of feature signals and one or more hidden Markov models trained using utterances spoken by a person whose identity is claimed, the first likelihood signal reflecting a probability that the individual's utterance was spoken by the person whose identity is claimed;
   c. forming one or more other likelihood signals based on the plurality of feature signals and one or more hidden Markov models trained using utterances spoken by a set of one or more other speakers who are acoustically similar to the person whose identity is claimed, said one or more other speakers who are acoustically similar to the person whose identity is claimed having been selected from a universe of speakers based on an acoustic similarity criterion, the criterion based on the one or more hidden Markov models of the person whose identity is claimed, the universe of speakers including one or more speakers who are not acoustically similar to the person whose identity is claimed based on the acoustic similarity criterion, the other likelihood signals reflecting probabilities that the utterance was spoken by said one or more other speakers who are acoustically similar to the person whose identity is claimed; and
   d. forming a verification signal, based on the first likelihood signal and one or more of the other likelihood signals, and not based on hidden Markov models trained using utterances spoken by at least one of said one or more speakers who are not acoustically similar to the person whose identity is claimed, said verification signal indicating whether the individual is the person whose identity is claimed.

2. The method of claim 1 wherein the individual is prompted to provide the utterance.

3. The method of claim 2 wherein the utterance comprises a series of digits.

4. The method of claim 3 wherein the digits in the series are chosen at random.

5. The method of claim 1 wherein the utterance comprises a predetermined set of one or more words.

6. The method of claim 1 wherein the utterance provided by the individual is provided with use of a communication channel having a first response characteristic and wherein utterances used to train the hidden Markov models of the person whose identity is claimed are provided with use of a communication channel having a second response characteristic.

7. The method of claim 6 wherein the communication channel having a first response characteristic comprises a microphone having a first microphone response characteristic, and wherein the communication channel having a second response characteristic comprises a microphone having a second microphone response characteristic.

8. The method of claim 1 wherein the step of analyzing the signal comprises the step of segmenting the feature signals into groups of feature signals which substantially represent words of the utterance.

9. The method of claim 8 wherein the step of segmenting is performed using a speech recognition system.

10. The method of claim 1 wherein the first and other likelihood signals are formed based on Viterbi scoring.

11. The method of claim 1 wherein the impostor selection criterion comprises determining a measure of similarity between the one or more hidden Markov models of the person whose identity is claimed and one or more hidden Markov models of another person.

12. The method of claim 1 wherein the acoustic similarity criterion comprises determining a measure of acoustic similarity between the person whose identity is claimed and another person based on
   a. a comparison of signals representing utterances spoken by the person whose identity is claimed and hidden Markov models of the other person; and
   b. a comparison of signals representing utterances spoken by the other person and hidden Markov models of the person whose identity is claimed.

13. The method of claim 1 wherein the step of forming a verification signal comprises the step of forming a signal reflecting a statistic of one or more other likelihood signals.

14. The method of claim 13 wherein the verification signal indicates that the individual is the person whose identity is claimed responsive to the first likelihood signal exceeding the statistic of the other likelihood signals.

15. The method of claim 13 wherein the first and other likelihood signals reflect log likelihood probabilities.

16. The method of claim 15 wherein the step of forming a verification signal further comprises the step of forming a signal reflecting a difference between the first likelihood signal and the signal reflecting a statistic of one or more other likelihood signals.

17. The method of claim 13 wherein the step of forming a verification signal further comprises the step of forming a signal reflecting a ratio of the first likelihood signal to the signal reflecting a statistic of one or more other likelihood signals.

* * * * *